United States Patent
Kang et al.

(10) Patent No.: US 9,655,060 B2
(45) Date of Patent: May 16, 2017

(54) METHOD AND APPARATUS FOR CONTROLLING POWER IN WIRELESS COMMUNICATION SYSTEM

(71) Applicants: Samsung Electronics Co., Ltd., Gyeonggi-do (KR); Korea University Research and Business Foundation, Seoul (KR)

(72) Inventors: Hye-Joong Kang, Busan (KR); Chung-Gu Kang, Seoul (KR)

(73) Assignees: Samsung Electronics Co., Ltd., Suwon-si (KR); Korea University Research and Business Foundation, Seoul (KR)

(*) Notice: Subject to any disclaimer, the term of this patent is extended or adjusted under 35 U.S.C. 154(b) by 92 days.

(21) Appl. No.: 14/508,984

(22) Filed: Oct. 7, 2014

(65) Prior Publication Data
US 2015/0098353 A1 Apr. 9, 2015

(30) Foreign Application Priority Data
Oct. 7, 2013 (KR) .................. 10-2013-0119001

(51) Int. Cl.
*H04W 52/24* (2009.01)

(52) U.S. Cl.
CPC ................. *H04W 52/245* (2013.01)

(58) Field of Classification Search
CPC ... H04B 7/0452; H04L 5/0053; H04L 1/0026; H04L 1/1812; H04W 52/16; H04W 52/245
See application file for complete search history.

(56) References Cited

U.S. PATENT DOCUMENTS

| | | | |
|---|---|---|---|
| 5,551,057 A | 8/1996 | Mitra | |
| 6,928,560 B1 | 8/2005 | Fell, III et al. | |
| 7,702,029 B2* | 4/2010 | Kotecha | H04B 7/0417 375/267 |
| 7,953,176 B2* | 5/2011 | Roh | H04B 7/0417 375/295 |
| 8,515,483 B2* | 8/2013 | Kuwahara et al. | 455/522 |
| 9,130,699 B2* | 9/2015 | Kawamura et al. | |
| 9,143,207 B2* | 9/2015 | Kim et al. | |
| 2007/0105581 A1 | 5/2007 | Ariyur | |
| 2010/0124178 A1 | 5/2010 | Baccelli et al. | |

\* cited by examiner

*Primary Examiner* — Ayaz Sheikh
*Assistant Examiner* — Debebe Asefa

(57) ABSTRACT

Provided is a method and apparatus for controlling power in a wireless communication system. The method includes a transmitter transmits a signal to multiple receivers. The method also includes receiving a feedback signal including channel state information from each of the multiple receivers. The method also includes calculating a sum of received signal strengths of the feedback signal received from each of the multiple receivers. The method also includes determining a power control value by using the channel state information for each of the multiple receivers and the sum of the received signal strengths. The method also includes controlling a transmission power based on the determined power control value.

24 Claims, 21 Drawing Sheets

METHOD AND APPARATUS FOR CONTROLLING POWER IN WIRELESS COMMUNICATION SYSTEM

CROSS-REFERENCE TO RELATED APPLICATION(S) AND CLAIM OF PRIORITY

The present application is related to and claims priority under 35 U.S.C. §119(a) to Korean Patent Application Serial number 10-2013-0119001, which was filed on Oct. 7, 2013 in the Korean Intellectual Property Office, the entire disclosure of which is hereby incorporated by reference.

TECHNICAL FIELD

Various embodiments of the present disclosure relate to a method and apparatus for controlling power in a wireless communication system.

BACKGROUND

In a wireless communication system spatially reusing radio resources, interference between neighboring links has a large influence upon the system's capacity. However, a signal acting as interference with respect to one link is a signal another link desires to receive, such that interference between the neighboring links may not be completely canceled. Thus, interference control may be carried out to maximize overall system performance by using radio resource control schemes such as transmission power or resource allocation and the like.

Generally, information about interference may be measured in a receiver. Multiple interference sources, which are arbitrarily distributed, may interfere with a receiver. In this embodiment, two problems may occur in association with power control feedback, as below.

(1) Interference caused by interference sources with respect to a particular receiver varies from interference source to interference source. Thus, the receiver needs to transmit power control feedback information including different information for different interference sources. As a result, the amount of power control feedback information increases in proportional to the number of interference sources.

(2) Even when the amount of power control feedback information may be ignored, synchronization and resource obtaining procedures need to be performed between the receiver and an interference source, such that the receiver transmits the power control feedback information to the interference source. However, such procedures cause high overhead in a situation where the interference source changes frequently due to the receiver's mobility.

Considering the foregoing problems, in a decentralized wireless communication system, a feedback operation could be performed without a procedure for establishing a separate link between a receiver and an interference source. Moreover, it is also necessary to design a feedback scheme and a channel by transmitting, from the receiver, a specific amount of feedback information regardless of the number of interference sources.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide a power control method and apparatus in a wireless communication system.

Various aspects of the present disclosure also provide a power control method and apparatus for inter-link interference control in a synchronous wireless communication system.

Various aspects of the present disclosure also provide a signaling method and apparatus for exchanging information necessary for power control by using the same size of radio resources regardless of the number of interference links.

Other objects to be provided in the present disclosure may be understood by embodiments described below.

According to an aspect of the present disclosure, there is provided a power control method for a transmitter in a wireless communication system, the power control method including transmitting a signal to multiple receivers, receiving a feedback signal including channel state information from each of the multiple receivers, calculating a sum of received signal strengths of the feedback signal received from each of the multiple receivers, and determining a power control value by using the channel state information for each of the multiple receivers and the sum of the received signal strengths, and controlling a transmission power based on the determined power control value.

According to another aspect of the present disclosure, there is provided a method for transmitting a feedback signal for power control for a receiver in a wireless communication system, the method including receiving a signal from a transmitter, measuring a received signal strength and an interference strength with respect to the received signal, determining channel state information and a transmission power based on the measured received signal strength and the measured interference strength, and transmitting a feedback signal including the channel state information to the transmitter by using the determined transmission power.

According to another aspect of the present disclosure, there is provided a transmitter in a wireless communication system, the transmitter including a transmission unit configured to transmit a signal to multiple receivers, a reception unit configured to receive a feedback signal including channel state information from each of the multiple receivers, and a controller configured to calculate a sum of received signal strengths of the feedback signal received from each of the multiple receivers, determine a power control value by using the channel state information for each of the multiple receivers and the sum of the received signal strengths, and control a transmission power based on the determined power control value.

According to another aspect of the present disclosure, there is provided a receiver in a wireless communication system, the receiver including a reception unit configured to receive a signal from a transmitter, a controller configured to measure a received signal strength and an interference strength with respect to the received signal and determine channel state information and a transmission power based on the measured received signal strength and the measured interference strength, and a transmission unit configured to transmit a feedback signal including the channel state information to the transmitter by using the determined transmission power.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts: The above and other aspects, features and advantages of embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
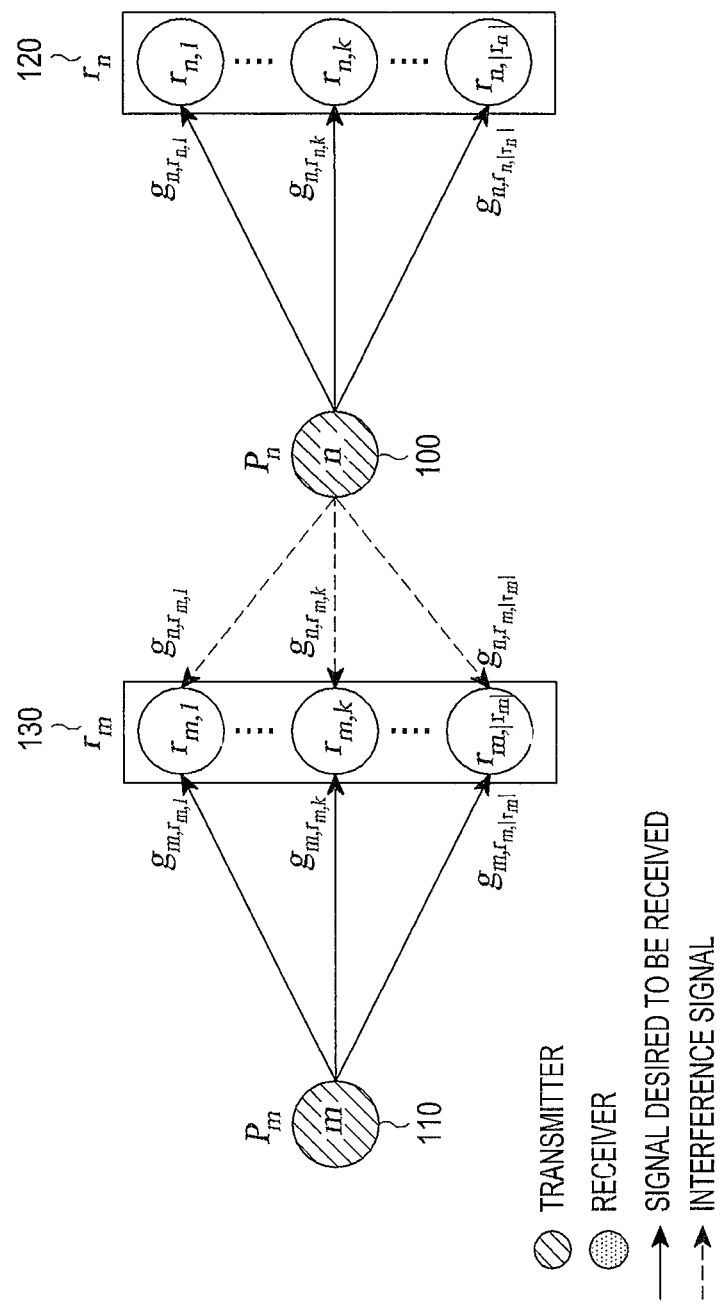
FIG. 1 illustrates an example of a transmitter and a receiver in a wireless communication system according to an embodiment of the present disclosure.

FIGS. 1 through 26, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method. Exemplary embodiments of the present disclosure will be described herein below with reference to the accompanying drawings. For the purposes of clarity and simplicity, detailed descriptions of well-known functions or configurations will be omitted as they would unnecessarily obscure the subject matters of the present disclosure. Also, the terms used herein are defined according to the functions of the present disclosure. Thus, the terms may vary depending on users' or operators' intentions or practices. Therefore, the terms used herein should be understood based on the descriptions made herein.

Although the present disclosure can be modified variously and have several embodiments, specific example embodiments are illustrated in the accompanying drawings and will be mainly described in the specification. However, the scope of the present disclosure is not limited to the specific embodiments and should be construed as including all the changes, equivalents, and substitutions included in the spirit and scope of the present disclosure.

Singular expressions such as "unless explicitly indicated otherwise" or "the" may be understood as including plural expressions. For example, "component surface" may include one or more component surfaces.

Although ordinal numbers such as "first", "second", and so forth will be used to describe various components, those components are not limited by the terms. For example, the terms do not limit the order and/or importance of the components. The terms are used for distinguishing one component from another component. For example, a first user device and a second user device are both user devices, and indicate different user devices. Also, a first component may be referred to as a second component and likewise, a second component may also be referred to as a first component, without departing from the teaching of the present disclosure.

Terms used in various embodiments of the present disclosure are intended to describe an exemplary embodiment, rather than to limit the various embodiments of the present disclosure. As used herein, the singular forms are intended to include the plural forms as well, unless the context clearly indicates otherwise. Terms "include" or "may include" used in various embodiments of the present disclosure indicate an existence of disclosed function, operation, or element, but do not limit an existence of one or more other functions, operations, or elements. Terms "include" or "has" used in the present disclosure should be understood that they are intended to indicate an existence of feature, number, step, operation, element, item or any combination thereof, disclosed in the specification, but should not be understood that they are intended to previously exclude an existence of one or more other features, numbers, steps, operations, elements, or any combination thereof or possibility of adding those things.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the specification with the context of the relevant art as understood by the artisan at the time of disclosure and will not be interpreted in an idealized or overly formal sense unless expressly so defined herein.

According to various embodiments of the present disclosure, an electronic device may be a device having a communication function. For example, the electronic device may include at least one of a smart phone, a tablet personal computer (PC), a mobile phone, a video phone, an electronic (e-)book reader, a desktop PC, a laptop PC, a netbook computer, a personal digital assistant (PDA), a portable multimedia player (PMP), an MP3 player, mobile medical equipment, a camera, a wearable device (for example, a head-mounted device (HMD) such as electronic glasses), an electronic cloth, an electronic bracelet, an electronic necklace, an electronic appcessory, an electronic tattoo, and a smart watch.

According to some embodiments, the electronic device may be a smart home appliance having a communication function. The smart home appliance may include, for example, a television (TV), a digital video disk (DVD) player, audio equipment, a refrigerator, an air conditioner, a vacuum cleaner, an oven, a microwave oven, a laundry machine, an air cleaner, a set-top box, a TV box (for example, HomeSync™ of Samsung, TV™ of Apple, or TV™ of Google), a game console, an electronic dictionary, an electronic key, a camcorder, and an electronic frame.

According to some embodiments, the electronic device may include at least one of various medical equipment (for example, magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (for example, a navigation device for ships, a gyroscope, or a compass), avionics, a security device, and an industrial or home robot.

According to some embodiments, the electronic device may include a part of a furniture or building/structure having a communication function, an electronic board, an electronic signature receiving device, a projector, and various measuring instruments (for example, a water, electricity, gas, or electric wave measuring device). The electronic device according to various embodiments of the present disclosure may be one of the above-listed devices or a combination thereof. It will be obvious to those of ordinary skill in the art that the electronic device according to various embodiments of the present disclosure is not limited to the above-listed devices.

According to various embodiments of the present disclosure, a receiver may be, for example, an electronic device.

An embodiment of the present disclosure proposes a power control method and apparatus in a wireless communication system. An embodiment of the present disclosure considers a synchronous wireless communication system where all radio links have the same time synchronization. For example, a wireless communication system according to an embodiment of the present disclosure may be a wireless communication system including macro-cells and femto-cells having subframe-based synchronization for interference control. In an embodiment of the present disclosure, a situation will be considered where multiple transmitters and receivers that perform transmission and reception by using the same radio resources are distributed at random in a wireless communication system.

Hereinafter, referring to FIG. 1, a transmitter and a receiver included in the wireless communication system will be described.

FIG. 1 illustrates an example of a transmitter and a receiver in a wireless communication system according to an embodiment of the present disclosure.

Referring to FIG. 1, the wireless communication system may include N transmitters, among which a transmitter n 100 performs an operation according to an embodiment of the present disclosure and a transmitter m 110 may be a transmitter different from the transmitter n 100.

The transmitter n 100 and the transmitter m 110 transmit a signal to multiple receivers, that is receivers $r_n$ 120 and $r_m$ 130 ($r_n = (r_{n,1}, r_{n,2}, \ldots, r_{n,|r_n|})$, $r_m = (r_{m,1}, r_{m,2}, \ldots, r_{m,|r_m|})$) by using transmission powers $p_n$ and $p_m$. Herein, $g_{i,j}$ represents a channel gain from a node i to a node j. An embodiment of the present disclosure will consider a feature of $g_{i,j} = g_{j,i}$ based on channel reciprocity. The channel reciprocity is used often when a channel of an uplink is estimated to obtain multi-antenna channel information of a downlink in a wireless communication system using time division duplexing (TDD) where a channel changes slowly.

Figure 2:
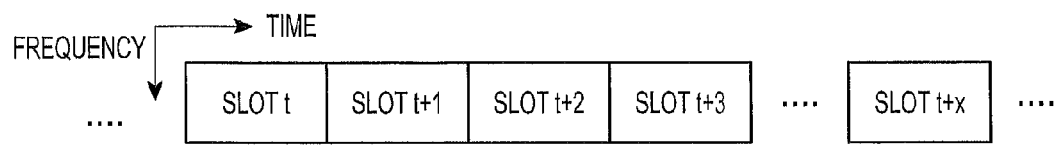
FIG. 2 illustrates a unit resource used between a transmitter and a receiver according to an embodiment of the present disclosure.

All the transmitters and the receivers may use a predetermined size of a time resource as illustrated in FIG. 2 as a unit resource for transmission and reception. The transmitters and the receivers all may also use a synchronous scheme where a unit resource starts at the same point in time.

Each transmitter may have target performance for power control as follows:

$$U = \sum_{n=1}^{N} \sum_{k=1}^{|r_n|} \frac{w_{r_{n,k}}}{|r_n|} R\left(\frac{g_{n,r_{n,k}} p_n}{I_{r_{n,k}} + n_{r_{n,k}}}\right) \quad (1)$$

$$= \sum_{n=1}^{N} \sum_{k=1}^{|r_n|} \frac{w_{r_{n,k}}}{|r_n|} \log_2\left(1 + \frac{g_{n,r_{n,k}} p_n}{I_{r_{n,k}} + n_{r_{n,k}}}\right),$$

where R(x), which is the same as $\log_2(1+x)$ (that is, $R(x) = \log_2(1+x)$), represents a yield or capacity function determined by a signal to interference and noise ratio (SINR). $I_{r_{n,k}}$ represents the size of interference received by a receiver $r_{n,k}$, where $I_{r_{n,k}} = \Sigma_m{}^{W} = _{2,m \neq k} g_{m,n_{n,k}} p_m$. $W_{r_{n,k}}$ represents a value multiplied to a yield or capacity of each receiver depending on the purpose of the system, such as, for example, priority, traffic load, or resource usage of each receiver, or the like.

Each transmitter which is to perform power control may gradually control its transmission power by using a value obtained by differentiating a target performance value of Equation 1 by its transmission power. This process may be expressed with respect to the transmission power $p_n$ of the transmitter n 100, as below.

$$p_n = \begin{cases} \min(p_{max}, p_n + \Delta) & \text{if } \frac{\partial U}{\partial p_n} > 0 \\ \max(p_{min}, p_n - \Delta) & \text{if } \frac{\partial U}{\partial p_n} \leq 0 \end{cases} \quad (2)$$

Referring to Equation 2, the transmitter n 100 increases its power by a predetermined value Δ, if a value $$\frac{\partial U}{\partial p_n}$$

obtained by differentiating a target performance value U of Equation 1 by the transmission power $p_n$ is greater than a specific value (for example, 0). The transmitter n 100 may also reduce the power by the predetermined value Δ, if the value $$\frac{\partial U}{\partial p_n}$$

obtained by differentiating the target performance value U of Equation 1 by the transmission power $p_n$ is less than or equal to the specific value (for example, 0). In this embodiment, the transmission power $p_n$ of the transmitter n 100 should be less than or equal to a maximum value $p_{max}$ and greater than or equal to a minimum value $p_{min}$.

In this way, for transmitter's power control, the value obtained by differentiating the target performance value U of Equation 1 by the transmission power $p_n$, that is, $$\frac{\partial U}{\partial p_n}$$

(hereinafter, referred to as a 'power control value') needs to be estimated or calculated. Thus, each transmitter and each receiver could exchange information necessary for estimation or calculation of the power control value. To recognize a type of information necessary for estimation or calculation of the power control value, the target performance value U of Equation 1 may be differentiated by the transmission power $p_n$, as expressed below.

$$\frac{\partial U}{\partial p_n} = \sum_{k=1}^{|k_n|} \frac{w_{r_{n,k}} g_{n,r_{n,k}}}{|r_n|(I_{r_{n,k}} + n_{r_{n,k}})} R'\left(\frac{g_{n,r_{n,k}} p_n}{I_{r_{n,k}} + n_{r_{n,k}}}\right) - \\ \sum_{\substack{m=1 \\ m \neq n}}^{N} \sum_{k=1}^{|r_n|} \frac{w_{r_{n,k}} g_{n,r_{m,n}} g_{m,r_{m,k}} p_m}{|r_m|(I_{r_{m,k}} + n_{r_{m,k}})^2} R'\left(\frac{g_{n,r_{n,k}} p_n}{I_{r_{n,k}} + n_{r_{n,k}}}\right)$$

$$= \log(2) \times \left(\sum_{k=1}^{|k_n|} \frac{1}{|r_n|}\left(\frac{w_{r_{n,k}} g_{n,r_{n,k}}}{I_{r_{n,k}} + g_{n,r_{n,k}} p_n + n_{r_{n,k}}}\right) - \\ \sum_{\substack{m=1 \\ m \neq n}}^{N} \sum_{k=1}^{|r_n|} \frac{w_{r_{n,k}} g_{n,r_{n,k}}}{|r_m|} \left(\frac{1}{I_{r_{m,k}} + n_{r_{m,k}}} - \frac{1}{I_{r_{m,k}} + g_{m,r_{m,k}} p_m + n_{r_{m,k}}}\right)\right)$$

$$= \log(2) \times \left(\sum_{k=1}^{|k_n|} \frac{w_{r_{n,k}}}{|r_n|}\left(\frac{g_{n,r_{n,k}}}{I_{r_{n,k}} + n_{r_{n,k}}}\right) - \\ \sum_{m=1}^{N} \sum_{k=1}^{|r_n|} \frac{w_{r_{n,k}} g_{n,r_{n,k}}}{|r_m|}\left(\frac{1}{I_{r_{m,k}} + n_{r_{m,k}}} - \frac{1}{I_{r_{m,k}} + g_{m,r_{m,k}} p_m + n_{r_{m,k}}}\right)\right)$$

$$= \log(2) \times \left(\sum_{k=1}^{|r_n|} \frac{w_{r_{n,k}} \eta_{r_{n,k}}}{|r_n| p_n} - \sum_{m=1}^{N} \sum_{k=1}^{|r_n|} g_{n,r_{m,k}} \beta_{r_{m,k}}\right), \quad (3)$$

where $\eta_{r_{m,k}}$ represents an SINR of a signal received by the receiver $r_{n,k}$ from the transmitter n 100, in which $$\eta_{r_{m,k}} = \frac{g_{n,r_{m,k}} p_n}{I_{r_{n,k}} + n_{r_{n,k}}}.$$

In Equation 3, $$\beta_{r_{n,k}} = \frac{w_{r_{m,k}}}{|r_n|}\left(\frac{1}{I_{r_{n,k}} + n_{r_{m,k}}} - \frac{1}{I_{r_{m,k}} + g_{m,r_{m,k}} p_m + n_{r_{m,k}}}\right).$$

In Equation 3, the term to be subtracted is made of the strength of the signal received by the receiver $r_{m,k}$ and the strength of interference $g_{m,r_{m,k}} p_m$ and noise $I_{r_{m,k}} + n_{r_{m,k}}$. $g_{m,r_{m,k}} p_m$ and $I_{r_{m,k}} + n_{r_{m,k}}$ may be specified by the receiver $r_{m,k}$ in a process where the receiver $r_{m,k}$ receives data transmitted by each transmitter, or may be measured by reception of a signal transmitted from each transmitter by the receiver $r_{m,k}$ in a separate measurement channel.

The receiver $r_{n,k}$ may directly feed the SINR $\theta_{r_{n,k}}$ back to its corresponding transmitter, the transmitter n 100. When power control is performed in the transmitter n 100, each receiver may not know a transmission power of the transmitter n 100 and thus may not separately measure an interference channel. As a result, each receiver may not measure $g_{n,r_{m,k}}$. Even when each receiver may measure $g_{n,r_{m,k}}$, every interference receiver needs to transmit $g_{n,r_{m,k}} \beta_{r_{m,k}}$ to the transmitter n 100 by using a separate channel, resulting in large resource consumption. In an embodiment, each receiver has multiple interference sources having an influence thereon, such that it may be difficult to provide feedback to each interference source. Hence, a separate feedback scheme for delivering each $g_{n,r_{m,k}} \beta_{r_{m,k}}$ is used.

An embodiment of the present disclosure proposes the following scheme for delivering $g_{n,r_{m,k}} \beta_{r_{m,k}}$ by the receiver $r_{m,k}$ to the transmitter n 100. That is, each receiver $r_{m,k}$ transmits a preamble or a signal having a predetermined pattern in a radio resource predefined for feedback by using a transmission power of $p_{r_{m,k}}^{S} = \delta \cdot \beta_{r_{m,k}}$, where $\delta$ represents a system parameter for scaling a transmission power. Each transmitter receives a signal in the radio resource predefined for feedback. However, each transmitter does not separately receive a feedback signal transmitted from each receiver and simply measures a sum of received powers. The strength of the feedback signal received by the particular transmitter n 100 in the feedback resource may be defined as $RSS_n$, as below.

$$RSS_n = \sum_{m=1}^{N} \sum_{k=1}^{|r_n|} g_{r_{m,k},n} p_{r_{m,k}}^{s} = \delta \cdot \sum_{m=1}^{N} \sum_{k=1}^{|r_n|} g_{r_{m,k},n} \beta_{r_{m,k}} \quad (4)$$

An embodiment of the present disclosure considers channel reciprocity, so in Equation 4, $g_{r_{m,k},n}$ and $g_{n,r_{m,k}}$ have the same value. Thus, $RSS_n$ may be expressed as below.

$$RSS_n = \delta \cdot \sum_{m=1}^{N} \sum_{k=1}^{|r_n|} g_{r_{m,k},n} \beta_{r_{m,k}} = \delta \cdot \sum_{m=1}^{N} \sum_{k=1}^{|r_n|} g_{n,r_{m,k}} \beta_{r_{m,k}} \quad (5)$$

Aside from Equation 5, the transmitter n 100 that is to perform power control is notified of an SINR defined according to Equation 6 from its serving receivers $r_{n,k}$ through a predefined feedback channel.

$$\eta_{r_{n,k}} = \frac{g_{n,r_{n,k}} p_n}{I_{r_{n,k}} + n_{r_{n,k}}} \quad (6)$$

The transmitter n 100 that is to perform power control calculates a value, that is, a power control value, by differentiating the target performance value U of Equation 1, which is a criterion for power control, by the transmission power $p_n$ based on Equation 7, by using feedback information given by Equation 4 and Equation 5.

$$\frac{\partial U}{\partial P_n} = \sum_{k=1}^{|k_n|} \frac{w_{r_{n,k}} \eta_{r_{n,k}}}{|r_n|} - \frac{RSS_n}{\delta} \quad (7)$$

Once the power control value is calculated using Equation 7, the transmitter n 100 controls a transmission power by using the scheme described in relation to Equation 1 and Equation 2.

In a control scheme that determines power for the next point in time by using current information, performance cannot be guaranteed if a point in time of power control and a point in time of actual data transmission using the determined power are different from each other.

In an embodiment, when one transmitter serves multiple receivers as illustrated in FIG. 1, one resource is available for data transmission to one receiver, such that a receiver for reception in a particular resource varies according to a scheduling method. When there is no transmission data in a buffer of a transmitter at a particular point in time because of non-consideration of a full-buffer traffic model, a transmitter participating in transmission changes. Thus, the above-described process of measuring and feeding back feedback information according to an embodiment of the present disclosure may be performed by a transmitter and a receiver that actually participate in transmission after power control.

Next, a detailed description will be made of a power control method when a transmitter and a receiver for data transmission and reception are not changed and of a power control method when the transmitter and the receiver for data transmission and reception are changed in a wireless communication system according to an embodiment of the present disclosure.

1. Power control method when a transmitter and a receiver for data transmission and reception are not changed in a wireless communication system The power control method corresponding to a situation when the transmitter and the receiver for data transmission and reception are not changed may include power control in a communication environment where an uplink and a downlink are not clearly distinguished, like in an environment where device-to-device (D2D) communication is performed, and power control in a communication environment where an uplink and a downlink are clearly distinguished, like when a TDD scheme is used. These two types of power control will be described below.

Figure 3:
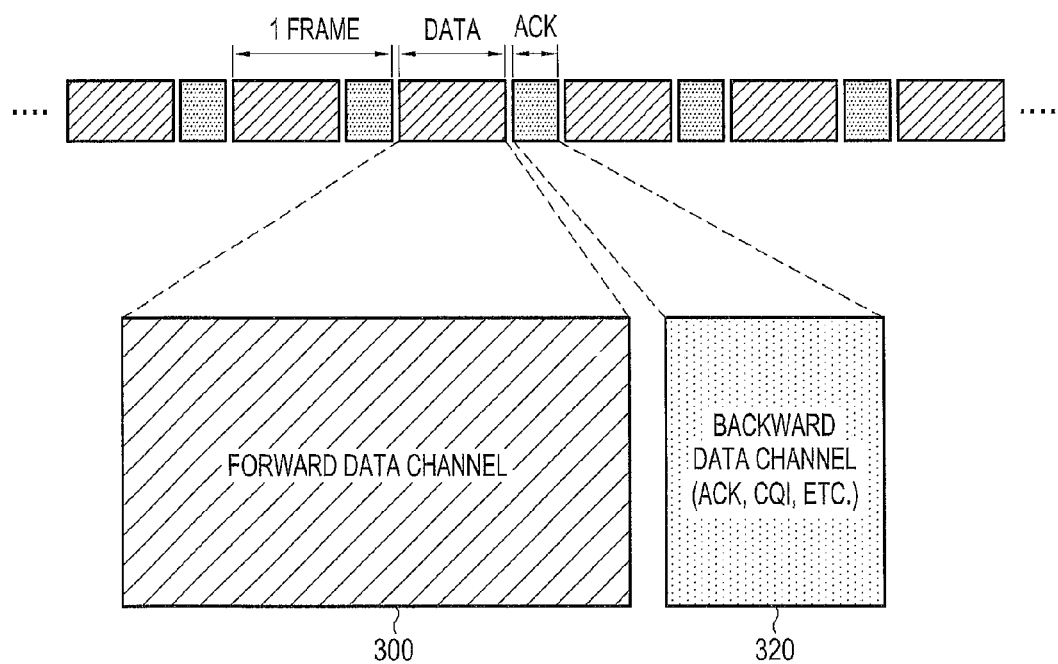
FIG. 3 illustrates an example of a resource configuration used when an uplink and a downlink are not clearly distinguished in a wireless communication system where a transmitter and a receiver for data transmission and reception are not changed according to an embodiment of the present disclosure.

(1) Communication Environment where an Uplink and a Downlink are not Clearly Distinguished FIG. 3 illustrates an example of a resource configuration used when an uplink and a downlink are not clearly distinguished in a wireless communication system where a transmitter and a receiver for data transmission and reception are not changed according to an embodiment of the present disclosure.

In communication where an uplink and a downlink are not clearly distinguished, a forward data channel 300 for data transmission and a backward control channel 320 for transmission of feedback information such as acknowledgement (ACK) or channel quality information (CQI) may be separately used based on a time axis. In FIG. 3, an example is illustrated where the forward data channel 300 and the backward control channel 320 exist on a time domain and a frequency domain, respectively.

If the transmitter and the receiver for data transmission and reception are not changed, the receiver $r_{m,k}$ measures a signal strength $g_{m,r_{m,k}}p_m$ and an interference and noise strength $I_{r_{m,k}}+n_{r_{m,k}}$ during data reception. The receiver $r_{m,k}$ may also use a transmission power of $p_{r_{m,k}}^S=\delta\cdot\beta_{r_{m,k}}$ when performing ACK or CQI feedback in the backward control channel 320.

In this embodiment, each transmitter measures a received power of the backward control channel 320 to obtain $RSS_n$ as expressed in Equation 5. The value $\theta_{r_{m,k}}$ of Equation 6 may be transmitted by being piggy-backed in ACK or CQI feedback information transmitted in a backward control channel corresponding to a forward data channel.

Figure 4:
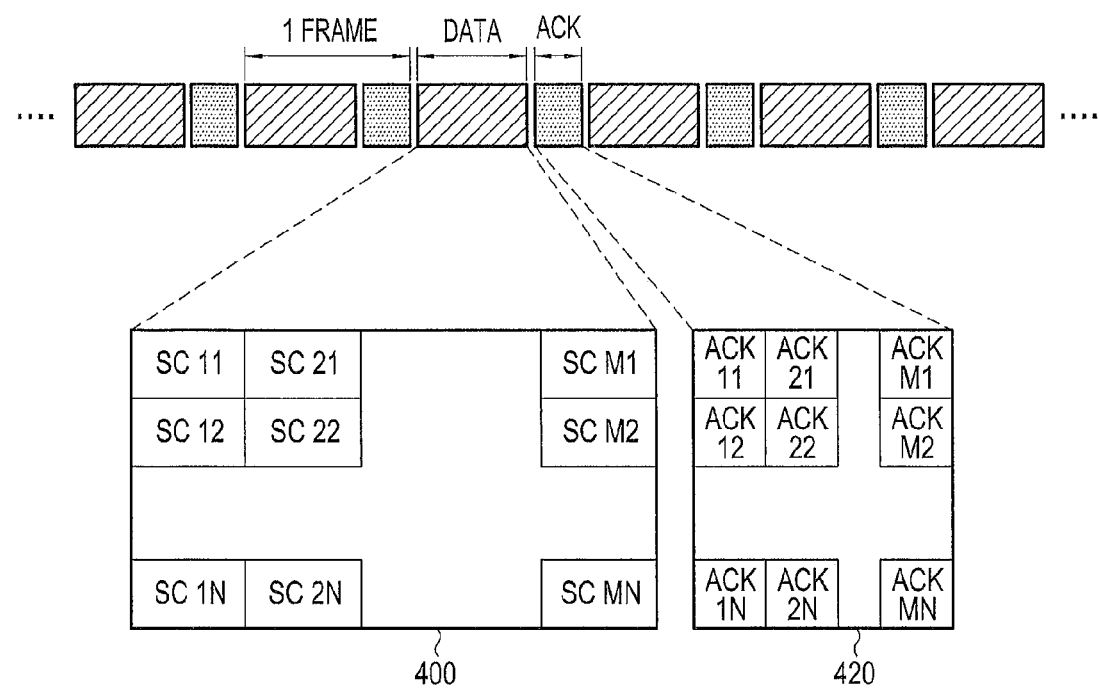
FIG. 4 illustrates another example of a resource configuration used when an uplink and a downlink are not clearly distinguished in a wireless communication system where a transmitter and a receiver for data transmission and reception are not changed according to an embodiment of the present disclosure.

FIG. 4 illustrates another example of a resource configuration used when an uplink and a downlink are not clearly distinguished in a wireless communication system where a transmitter and a receiver for data transmission and reception are not changed according to an embodiment of the present disclosure.

In FIG. 4, an example is illustrated where a forward data channel 400 and a backward control channel 420 are used as multiple subchannels on the time domain and the frequency domain, respectively. Referring to FIG. 4, multiple forward data subchannels SC 11 through SC MN one-to-one correspond to multiple backward control subchannels ACK 11 through ACK MN. The multiple forward data subchannels SC 11 through SC MN and the multiple backward control subchannels ACK 11 through ACK MN exist on the same position on the frequency domain.

The receiver $r_{m,k}$ measures a signal strength $g_{m,r_{m,k}}p_m$ and an interference and noise strength $I_{r_{m,k}}+n_{r_{m,k}}$ for each forward data subchannel to be received by the receiver $r_{m,k}$. The receiver $r_{m,k}$ may feedback ACK or CQI information with a transmission power of $p_{r_{m,k}}^S=\delta\cdot\beta_{r_{m,k}}$ by using a backward control subchannel corresponding to each forward data subchannel.

In this embodiment, each transmitter measures a received power of a backward control subchannel corresponding to its forward data subchannel, thereby obtaining $RSS_n$ for each forward data subchannel as expressed in Equation 5. The value $\eta_{r_{m,k}}$ for each forward data subchannel transmitted by each transmitter, as expressed in Equation 6, is transmitted by being piggybacked in ACK or CQI feedback information transmitted in a backward control subchannel corresponding to a forward data subchannel.

Figure 5:
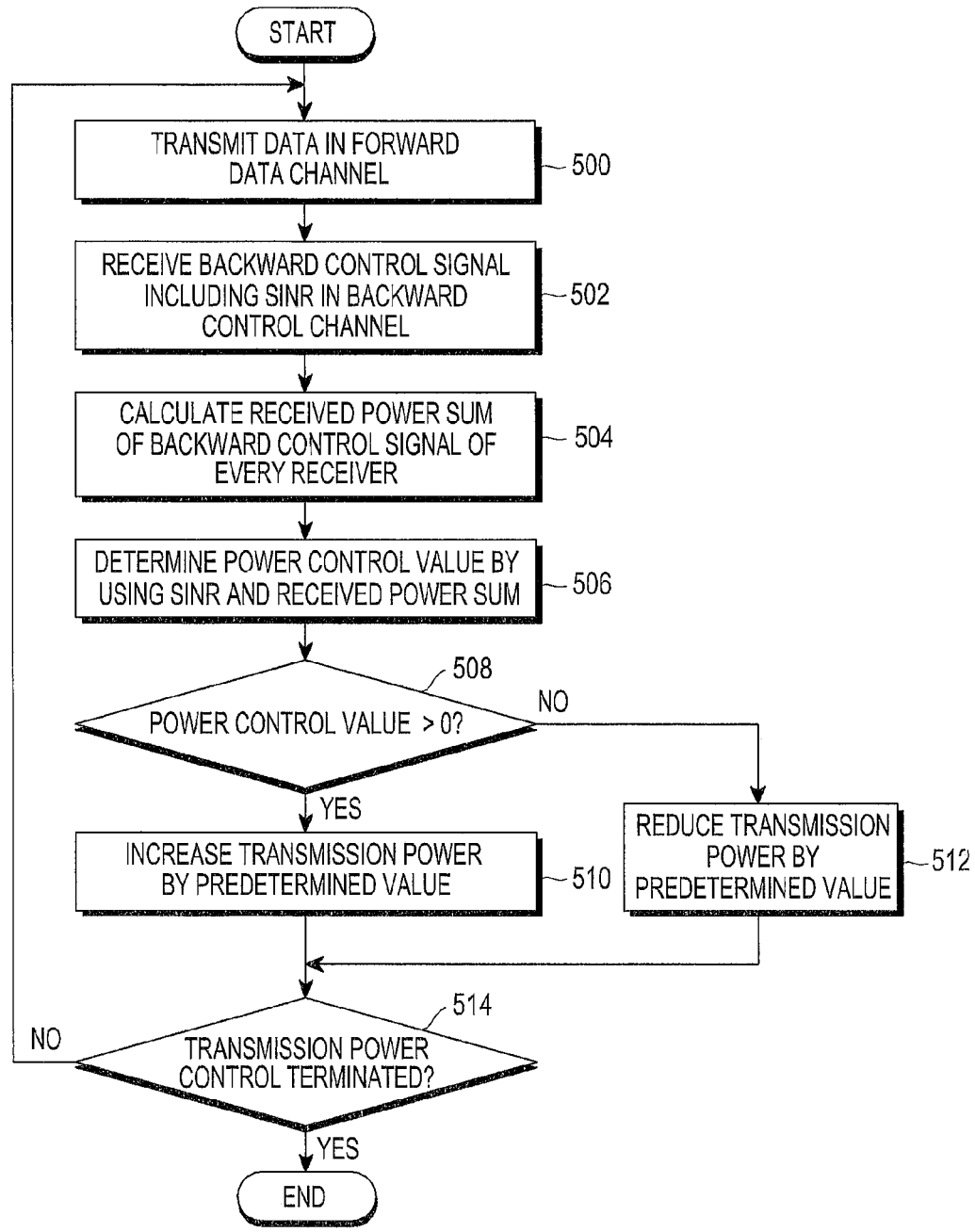
FIG. 5 illustrates a process of an operation of a transmitter in a wireless communication system where the transmitter and a receiver for data transmission and reception are not changed and an uplink and a downlink are not clearly distinguished according to an embodiment of the present disclosure.
Figure 6:
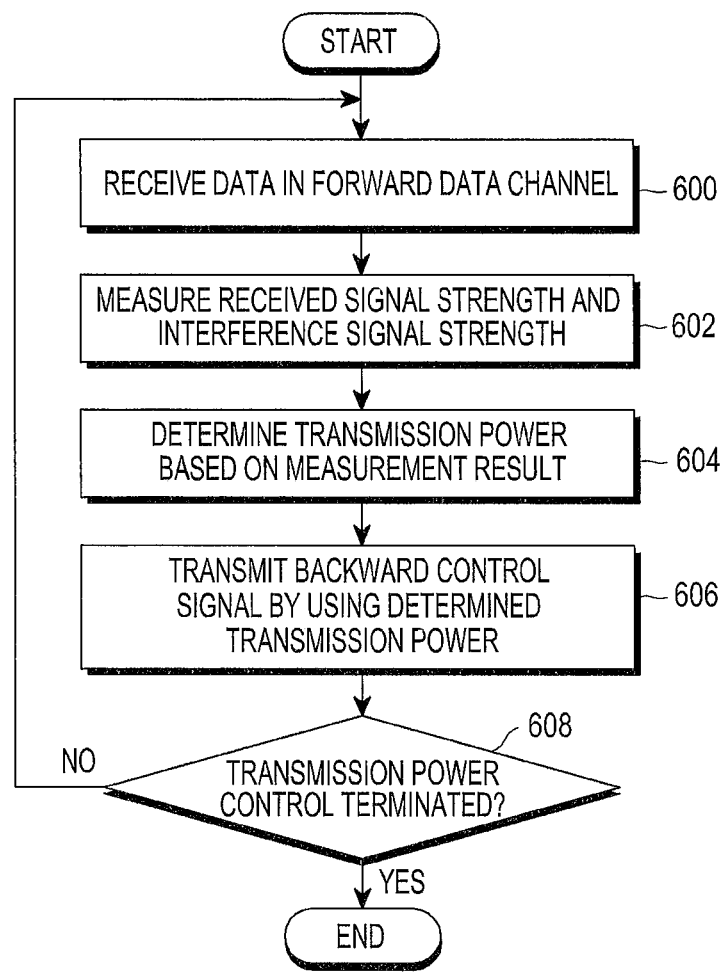
FIG. 6 illustrates a process of an operation of a receiver in a wireless communication system where a transmitter and the receiver for data transmission and reception are not changed and an uplink and a downlink are not clearly distinguished according to an embodiment of the present disclosure.

Referring to FIGS. 5 and 6, a description will be made of operations of a transmitter and a receiver in a wireless communication system where a transmitter and a receiver for data transmission and reception are not changed and an uplink and a downlink are not clearly distinguished.

FIG. 5 illustrates a process of an operation of a transmitter in a wireless communication system where the transmitter and a receiver for data transmission and reception are not changed and an uplink and a downlink are not clearly distinguished according to an embodiment of the present disclosure.

Referring to FIG. 5, a transmitter n transmits data to a receiver $r_{n,k}$ in a forward data channel (or a forward data subchannel) in operation 500. The transmitter n receives a backward control signal transmitted by the receiver $r_{n,k}$ in a backward control channel (or a backward control subchannel) in operation 502. The backward control signal may include SINR $\eta_{r_{n,k}}$.

The transmitter n calculates a received power sum $RSS_n$ of a backward control signal of every receiver in the backward control channel in operation 504. The transmitter n then determines a power control value $$\frac{\partial U}{\partial P_n}$$

by using the SINR $\eta_{r_{n,k}}$ and the received power sum $RSS_n$ in operation 506. The transmitter n may determine the power control value by using Equation 7.

The transmitter n determines whether the power control value is greater than a predetermined value (for example, 0). If the power control value is greater than 0, the transmitter n goes to operation 510 to increase a transmission power by a predetermined value. The transmitter n goes to operation 512 to reduce the transmission power by the predetermined value, if the power control value is not greater than 0.

The foregoing operation may be continuously repeated until the transmitter n terminates transmission power control in operation 514.

Although FIG. 5 illustrates the operations of the transmitter in the wireless communication system where the transmitter and the receiver for data transmission and reception are not changed and the uplink and the downlink are not clearly distinguished, various modifications may be made to FIG. 5. For example, continuous operations are illustrated in FIG. 5, but the operations illustrated in FIG. 5 may overlap with one another, may be performed in parallel with one another, may be performed in other orders, or may be performed several times.

FIG. 6 illustrates a process of operations of a receiver in a wireless communication system where a transmitter and the receiver for data transmission and reception are not changed and an uplink and a downlink are not clearly distinguished according to an embodiment of the present disclosure.

Referring to FIG. 6, the receiver $r_{n,k}$ receives data from the transmitter n in a forward data channel (or a forward data subchannel) in operation 600. The receiver $r_{n,k}$ then measures a received signal strength S and an interference signal strength I for the transmitter n in operation 602, and determines a transmission power for a backward control signal based on the measurement result in operation 604.

For example, the receiver $r_{n,k}$ may measure a received signal strength and an interference signal strength for the transmitter n to calculate $\beta_{r_{n,k}}$ and determine a transmission power for a backward control signal by using the calculated $\beta_{r_{n,k}}$. The transmission power for the backward control signal may be determined as $p_{r_{n,k}}^S = \delta \cdot \beta_{r_{n,k}}$.

Once the transmission power is determined as described above, the receiver $r_{n,k}$ transmits the backward control signal to the transmitter n by using the determined transmission power in operation 606. The backward control signal may include an SINR $\eta_{r_{n,k}}$ generated based on the received signal strength and the interference signal strength.

The foregoing operations may be continuously repeated until the receiver $r_{n,k}$ determines in operation 608 that the transmission power control operation of the transmitter n is terminated.

Although FIG. 6 illustrates the operations of the receiver in the wireless communication system where the transmitter and the receiver for data transmission and reception are not changed and the uplink and the downlink are not clearly distinguished according to an embodiment of the present disclosure, various modifications may be made to FIG. 6. For example, although continuous operations are illustrated in FIG. 6, these operations may overlap with one another, may be performed in parallel, may be performed in other orders, or may be performed several times.

Figure 7:
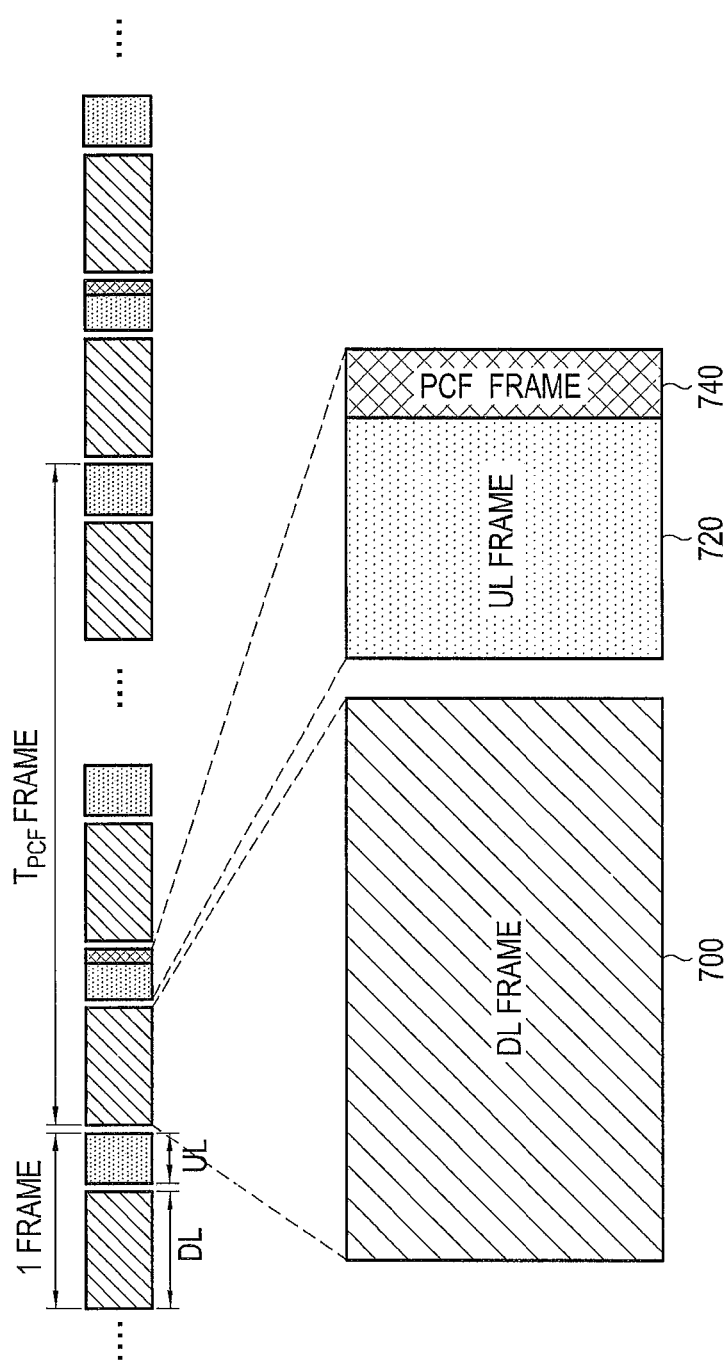
FIG. 7 illustrates an example of a resource configuration used when an uplink and a downlink are clearly distinguished in a wireless communication system where a transmitter and a receiver for data transmission and reception are not changed according to an embodiment of the present disclosure.

(2) Communication Environment where an Uplink and a Downlink are Clearly Distinguished FIG. 7 illustrates an example of a resource configuration used when an uplink and a downlink are clearly distinguished in a wireless communication system where a transmitter and a receiver for data transmission and reception are not changed according to an embodiment of the present disclosure.

Referring to FIG. 7, in a communication environment where a TDD scheme is used, an uplink and a downlink are clearly distinguished, such that all time resources may be used separately for a downlink frame 700, which is used for a transmitter (for example, a base station) to transmit data to a receiver (for example, a terminal) and an uplink frame 720, which is used for the receiver to transmit data to the transmitter. In addition, as illustrated in FIG. 7, a power control feedback (PCF) frame 740 for downlink PCF is separately defined in an uplink. The PCF frame 740 exists in an uplink resource at intervals of $T_{PCF}$ and power control may also be performed at intervals of $T_{PCF}$.

If the transmitter and the receiver for data transmission and reception are not changed, the receiver $r_{m,k}$ measures a downlink signal strength $g_{m,r_{m,k}} p_m$ and an interference and noise strength $I_{r_{m,k}} + n_{r_{m,k}}$. The receiver $r_{m,k}$ may use a transmission power of $p_{r_{m,k}}^S = \delta \cdot \beta_{r_{m,k}}$ when transmitting feedback in the PCF frame 740.

In this embodiment, each transmitter may obtain $RSS_n$ as expressed in Equation 5 by measuring a received power in the PCF frame 740. The value $\eta_{r_{m,k}}$ expressed in Equation 6 may be transmitted to the transmitter n from the receiver $r_{m,k}$ by being piggybacked in an existing feedback channel used to feed back ACK or CQI, separately from a channel corresponding to the PCF frame 740. In another way, the value $\eta_{r_{m,k}}$ may be transmitted n from the receiver $r_{m,k}$ by using a separate channel for feeding back $\eta_{r_{m,k}}$.

Figure 8:
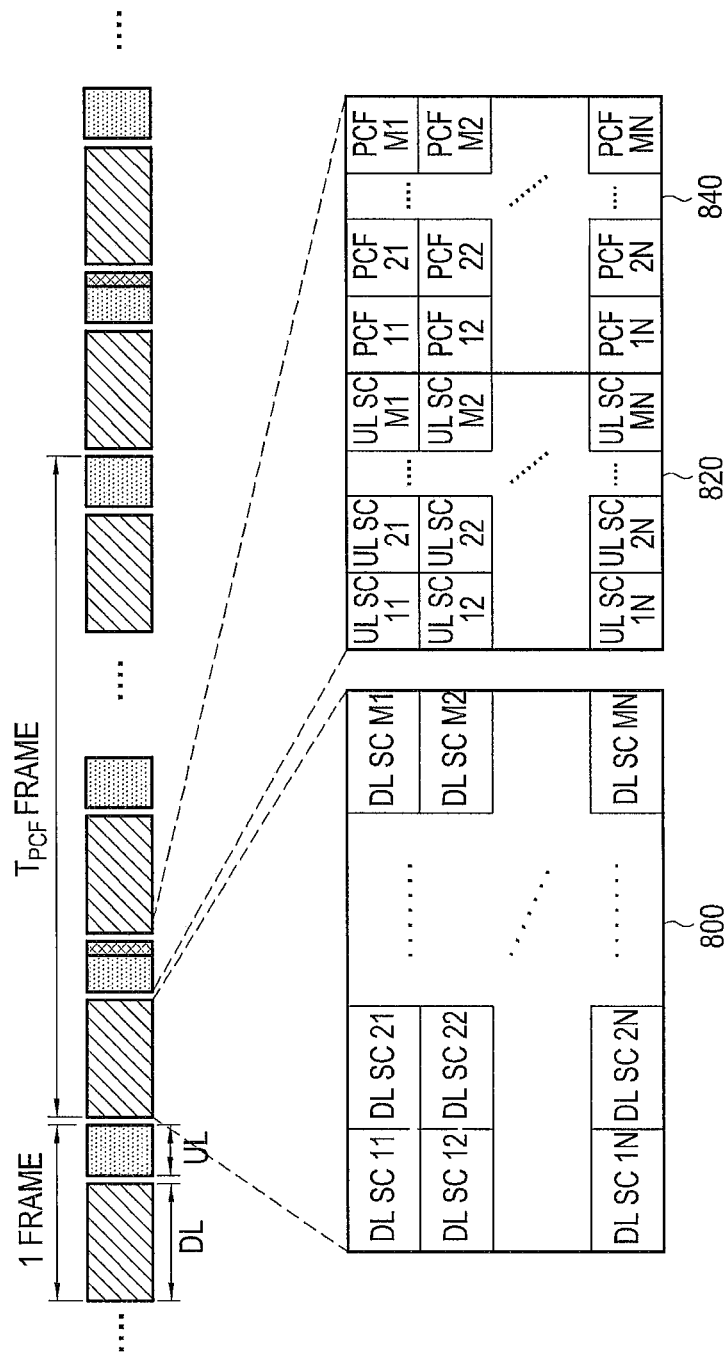
FIG. 8 illustrates another example of a resource configuration used when an uplink and a downlink are clearly distinguished in a wireless communication system where a transmitter and a receiver for data transmission and reception are not changed according to an embodiment of the present disclosure.

FIG. 8 illustrates another example of a resource configuration used when an uplink and a downlink are clearly distinguished in a wireless communication system where a transmitter and a receiver for data transmission and reception are not changed according to an embodiment of the present disclosure.

In FIG. 8, an example is illustrated where a downlink frame 800, an uplink frame 820, and a PCF frame 840 are separately used as multiple subchannels on a time domain and a frequency domain. Referring to FIG. 8, multiple downlink subchannels DL SC 11 through DL SC MN one-to-one correspond to multiple PCF subchannels PCF 11 through PCF MN. The multiple downlink subchannels DL SC 11 through DL SC MN and the multiple PCF subchannels PCF 11 through PCF MN exist in the same positions on the frequency domain.

When the transmitter and the receiver for data transmission and reception are not changed, the receiver $r_{m,k}$ measures a signal strength $g_{m,r_{m,k}} p_m$ for each downlink subchannel the receiver $r_{m,k}$ is to receive and an interference and noise strength $I_{r_{m,k}} + n_{r_{m,k}}$. The receiver $r_{m,k}$ may transmit power control feedback with a transmission power of $p_{r_{m,k}}^S = \delta \cdot \beta_{r_{m,k}}$ by using a PCF subchannel corresponding to each downlink subchannel.

In this embodiment, each transmitter may measure a received power of a PCF subchannel corresponding to its downlink subchannel to obtain $RSS_n$ for each downlink subchannel as expressed in Equation 5. The value $\eta_{r_{m,k}}$ for each downlink subchannel, expressed in Equation 6, may be transmitted from the receiver $r_{m,k}$ to the transmitter n by being piggybacked in an existing feedback channel used to feed back ACK or CQI, separately from the channel corresponding to the PCF frame 840. In another way, for each downlink subchannel may be transmitted from the receiver $r_{m,k}$ to the transmitter n by using a separate channel for feeding back $\eta_{r_{m,k}}$.

Figure 9:
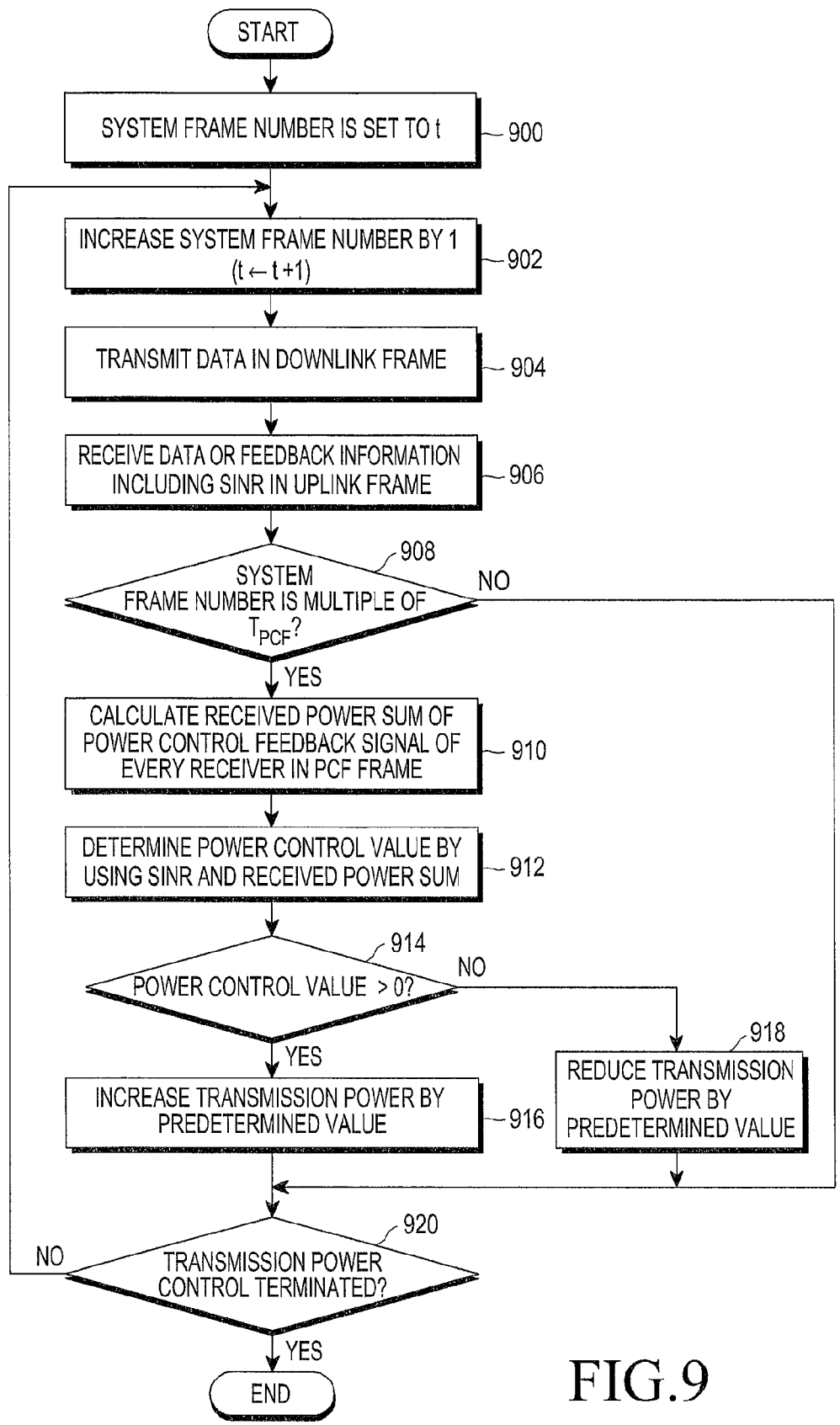
FIG. 9 illustrates a process of an operation of a transmitter in a wireless communication system where the transmitter and a receiver for data transmission and reception are not changed and an uplink and a downlink are clearly distinguished according to an embodiment of the present disclosure.
Figure 10:
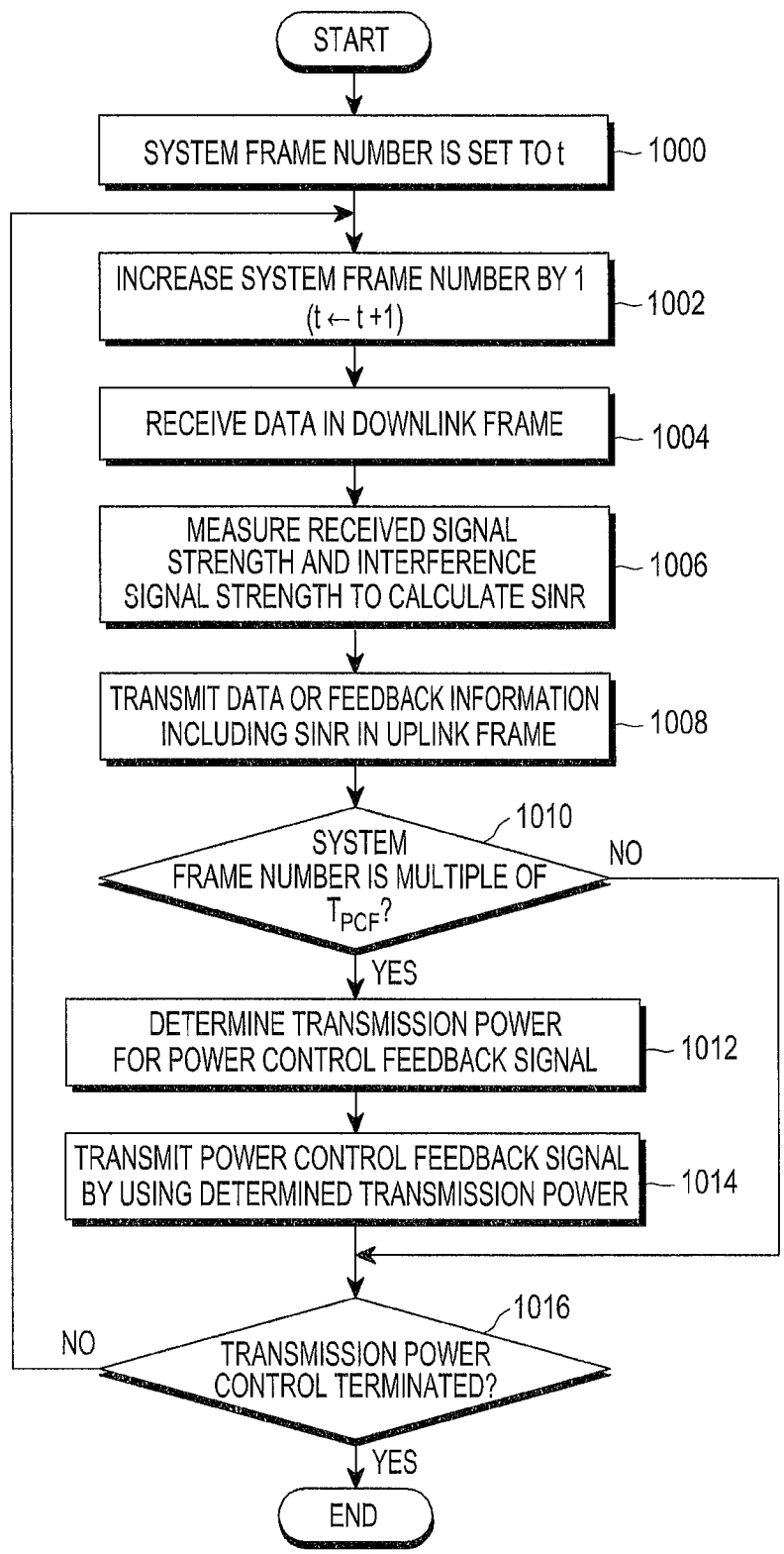
FIG. 10 illustrates a process of an operation of a receiver in a wireless communication system where a transmitter and the receiver for data transmission and reception are not changed and an uplink and a downlink are clearly distinguished according to an embodiment of the present disclosure.

Referring to FIGS. 9 and 10, a description will be made of operations of a transmitter and a receiver in a wireless communication system where the transmitter and the receiver for data transmission and reception are not changed and an uplink and a downlink are clearly distinguished.

FIG. 9 illustrates a process of an operation of a transmitter in a wireless communication system where the transmitter and a receiver for data transmission and reception are not changed and an uplink and a downlink are clearly distinguished according to an embodiment of the present disclosure.

Referring to FIG. 9, if a system frame number is set to t in operation 900, the transmitter n increases the system frame number by 1 (that is, t is updated to (t+1)) in operation 902. The transmitter n transmits data to the receiver $r_{n,k}$ in a downlink frame (or a downlink subchannel) in operation 904.

The transmitter n receives uplink data or feedback information transmitted by the receiver $r_{n,k}$ in an uplink frame in operation 906. The uplink data or the feedback information may include SINR $\eta_{r_{n,k}}$.

The transmitter n determines whether the system frame number is a multiple of $T_{PCF}$ in operation 908. If the system frame number is not a multiple of $T_{PCF}$, the transmitter n goes to operation 916 to perform an operation with respect to a system frame having a next number.

If the system frame number is a multiple of $T_{PCF}$, the transmitter n goes to operation 910 to calculate a received power sum $RSS_n$ of a power control feedback signal of every receiver in a PCF frame (or a PCF subchannel). The transmitter n then determines a power control value $$\frac{\partial U}{\partial P_n}$$

by using the SINR $\eta_{r_{n,k}}$ and the received power sum $RSS_n$ in operation 912. In this embodiment, the transmitter n may determine the power control value by using Equation 7.

The transmitter n determines whether the power control value is greater than a particular value (for example, 0) in operation 914. If the power control value is greater than 0, the transmitter n goes to operation 916 to increase the transmission power by a predetermined value. If the power control value is not greater than 0, the transmitter n goes to operation 918 to reduce the transmission power by the predetermined value.

The foregoing operations may be continuously repeated until the transmitter n terminates transmission power control in operation 920.

Although FIG. 9 illustrates the operations of the transmitter in the wireless communication system where the transmitter and the receiver for data transmission and reception are not changed and the uplink and the downlink are clearly distinguished according to an embodiment of the present disclosure, various modifications may be made to FIG. 9. For example, continuous operations are illustrated in FIG. 9, but these operations may overlap with one another, may be performed in parallel, may be performed in other orders, or may be performed several times.

FIG. 10 illustrates a process of an operation of a receiver in a wireless communication system where a transmitter and the receiver for data transmission and reception are not changed and an uplink and a downlink are clearly distinguished according to an embodiment of the present disclosure.

Referring to FIG. 10, if a system frame number is set to t in operation 1000, the receiver $r_{n,k}$ increases the system frame number by 1 (that is, t is updated to (t+1)) in operation 1002. The receiver $r_{n,k}$ then receives data from the transmitter n in a downlink frame (or a downlink subchannel) in operation 1004.

The receiver $r_{n,k}$ measures a received signal strength S and an interference signal strength I for the transmitter n to calculate SINR $\eta_{r_{n,k}}$ in operation 1006. The receiver $r_{n,k}$ transmits uplink data or feedback information including SINR $\eta_{r_{n,k}}$ to the transmitter n in an uplink frame in operation 1008.

The transmitter $r_{n,k}$ determines whether the system frame number is a multiple of $T_{PCF}$ in operation 1010. If the system frame number is not a multiple of $T_{PCF}$, the transmitter n goes to operation 1016 to perform an operation corresponding to a system frame having a next number.

If the system frame number is a multiple of $T_{PCF}$, the transmitter n goes to operation 1012 to determine a transmission power for a power control feedback signal. For example, the receiver $r_{n,k}$ measures a received signal strength and an interference signal for the transmitter n to calculate $\beta_{r_{n,k}}$ and determines a transmission power for the power control feedback signal by using the calculated $\beta_{r_{n,k}}$. The transmission power for the power control feedback signal may be defined as $p_{r_{n,k}}^S = \delta \cdot \beta_{r_{n,k}}$.

Once the transmission power is determined, the receiver $r_{n,k}$ transmits the power control feedback signal to the transmitter n in a PCF channel by using the determined transmission power in operation 1014.

The foregoing operations may be continuously repeated until the receiver $r_{n,k}$ determines that the transmission power control operation of the transmitter n is terminated, in operation 1016.

Although FIG. 10 illustrates the operations of the receiver in the wireless communication system where the transmitter and the receiver for data transmission and reception are not changed and the uplink and the downlink are clearly distinguished according to an embodiment of the present disclosure, various modifications may be made to FIG. 10. For example, continuous operations are illustrated in FIG. 10, but these operations overlap with one another, may be performed in parallel, may be performed in other orders, or may be performed several times.

2. Power Control Method when a Transmitter and a Receiver for Data Transmission and Reception are Changed in a Wireless Communication System The power control method corresponding to a situation where a transmitter and a receiver for data transmission and reception are changed may include power control in a communication environment where an uplink and a downlink are not clearly distinguished like in D2D communication between terminals and power control in a communication environment where an uplink and a downlink are clearly distinguished like in communication between a terminal and a base station. These two types of power control will be described below.

Figure 11:
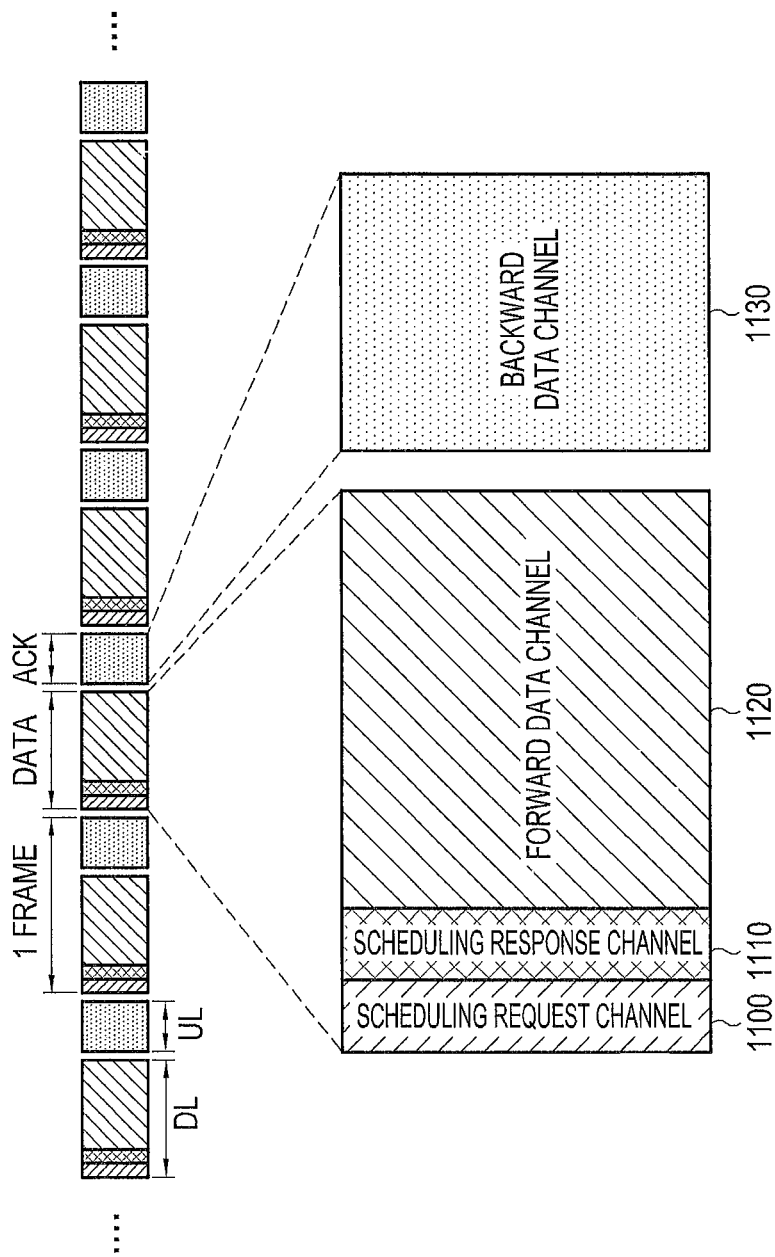
FIG. 11 illustrates an example of a resource configuration used when an uplink and a downlink are not clearly distinguished in a wireless communication system where a transmitter and a receiver for data transmission and reception are changed according to an embodiment of the present disclosure.

(1) Communication Environment where an Uplink and a Downlink are not Clearly Distinguished FIG. 11 illustrates an example of a resource configuration used when an uplink and a downlink are not clearly distinguished in a wireless communication system where a transmitter and a receiver for data transmission and reception are changed according to an embodiment of the present disclosure.

Referring to FIG. 11, an example is illustrated where a scheduling request channel 1100 used for a transmitter that is to transmit data in a frame to notify a receiver that is to receive the data of whether the transmitter transmits the data, a scheduling response channel 1110 used for the receiver to transmit a scheduling response to the scheduling request to the transmitter, a forward data channel 1120 for data transmission, and a backward control channel 1130 for transmission of feedback information such as ACK or CQI may be separately used based on the time axis. In FIG. 11, the forward data channel 1120 and the backward control channel 1130 exist on the time domain and the frequency domain, respectively.

The transmitter and the receiver may change from frame to frame. Thus, a transmitter n that is to transmit data in a frame sends a scheduling request message to a target receiver $r_{n,k}$ by using the scheduling request channel 1100. Herein, the scheduling request message may include an index for specifying the transmitter and the receiver, and the index may be set to a value for identifying the transmitter and the receiver. Every receiver may monitor whether the scheduling request message is received in the scheduling request channel 1100.

Upon receiving the scheduling request message, the receiver $r_{n,k}$ sends a scheduling response message to the transmitter n in the scheduling response channel 1110. In this embodiment, the receiver $r_{n,k}$ sends the scheduling response message by using a transmission power of $p_{r_{n,k}}^{\ s}=\delta\cdot\beta_{r_{n,k}}$, where $\beta_{r_{n,k}}$ may be calculated by measuring a received signal strength $g_{n,r_{n,k}}p_n$ and an interference and noise strength $I_{r_{n,k}}+n_{r_{n,k}}$ in a process of receiving the scheduling request message. The scheduling response message may include an index for specifying the transmitter and the receiver and SINR $\eta_{r_{n,k}}$.

Figure 12:
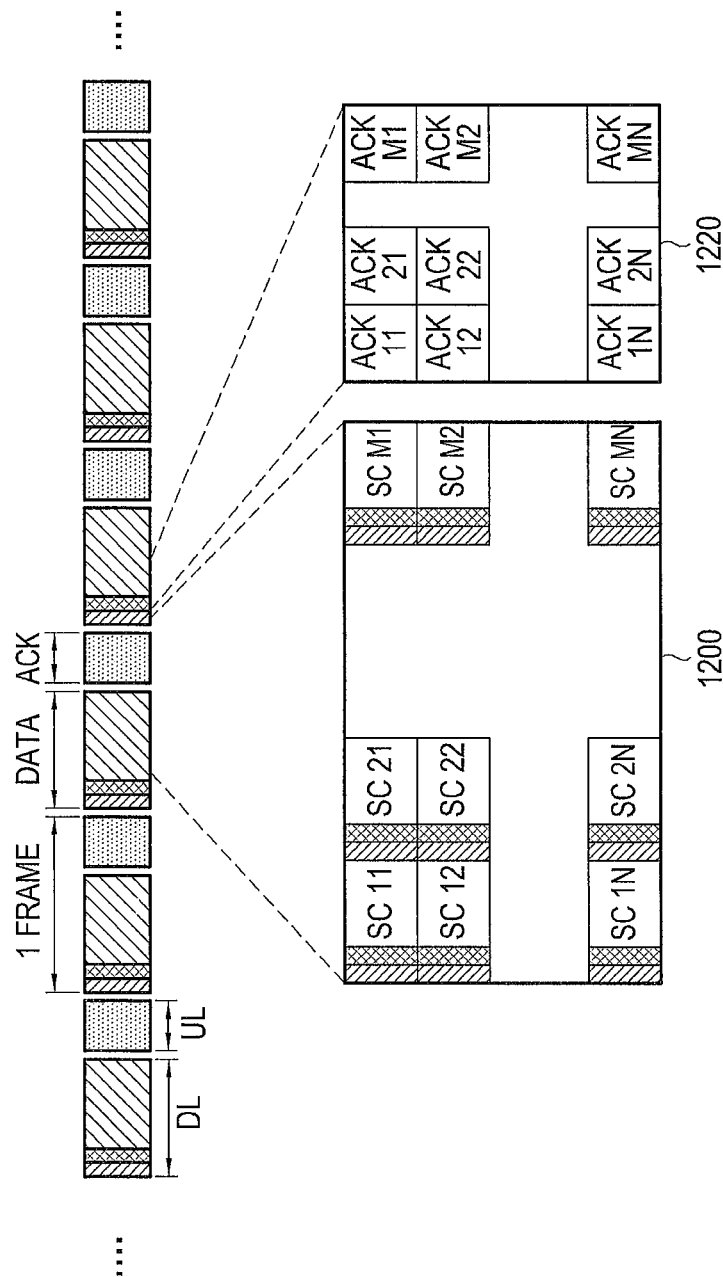
FIG. 12 illustrates another example of a resource configuration used when an uplink and a downlink are not clearly distinguished in a wireless communication system where a transmitter and a receiver for data transmission and reception are changed according to an embodiment of the present disclosure.

FIG. 12 illustrates another example of a resource configuration used when an uplink and a downlink are not clearly distinguished in a wireless communication system where a transmitter and a receiver for data transmission and reception are changed according to an embodiment of the present disclosure.

In FIG. 12, an example is illustrated where a forward data channel 1200 and a backward control channel 1210 are separately used as multiple subchannels on the time domain and the frequency domain. Referring to FIG. 12, multiple forward data subchannels SC 11 through SC MN one-to-one correspond to multiple backward control subchannels ACK 11 through ACK MN. The multiple forward data subchannels SC 11 through SC MN and the multiple backward control subchannels ACK 11 through ACK MN exist on the same positions on the frequency domain.

The transmitter and the receiver for data transmission and reception may change from frame to frame, such that a scheduling request subchannel and a scheduling response subchannel exist corresponding to each forward data subchannel. A transmitter n that is to transmit data in a forward data subchannel of a frame sends a scheduling request message to a target receiver rn,k. In this embodiment, the transmitter n may send the scheduling request message in a scheduling request subchannel corresponding to the forward data subchannel.

The scheduling request message may include an index for specifying the transmitter and the receiver, and the index may be set to a value for identifying the transmitter and the receiver. Every receiver may monitor whether the scheduling request message is received in every scheduling request subchannel.

Upon receiving the scheduling request message, the receiver $r_{n,k}$ sends a scheduling response message to the transmitter n in a scheduling response subchannel corresponding to the scheduling request subchannel. The receiver $r_{n,k}$ sends the scheduling response message by using a transmission power of $p_{r_{n,k}}^{\ s}=\delta\cdot\beta_{r_{n,k}}$. Herein, $\beta_{r_{n,k}}$ may be calculated by measuring a received signal strength $g_{n,r_{n,k}}p_n$ and an interference and noise strength $I_{r_{n,k}}+n_{r_{n,k}}$ in a process of receiving the scheduling request message. The scheduling response message may include an index for specifying the transmitter and the receiver and SINR $\eta_{r_{n,k}}$.

Figure 13:
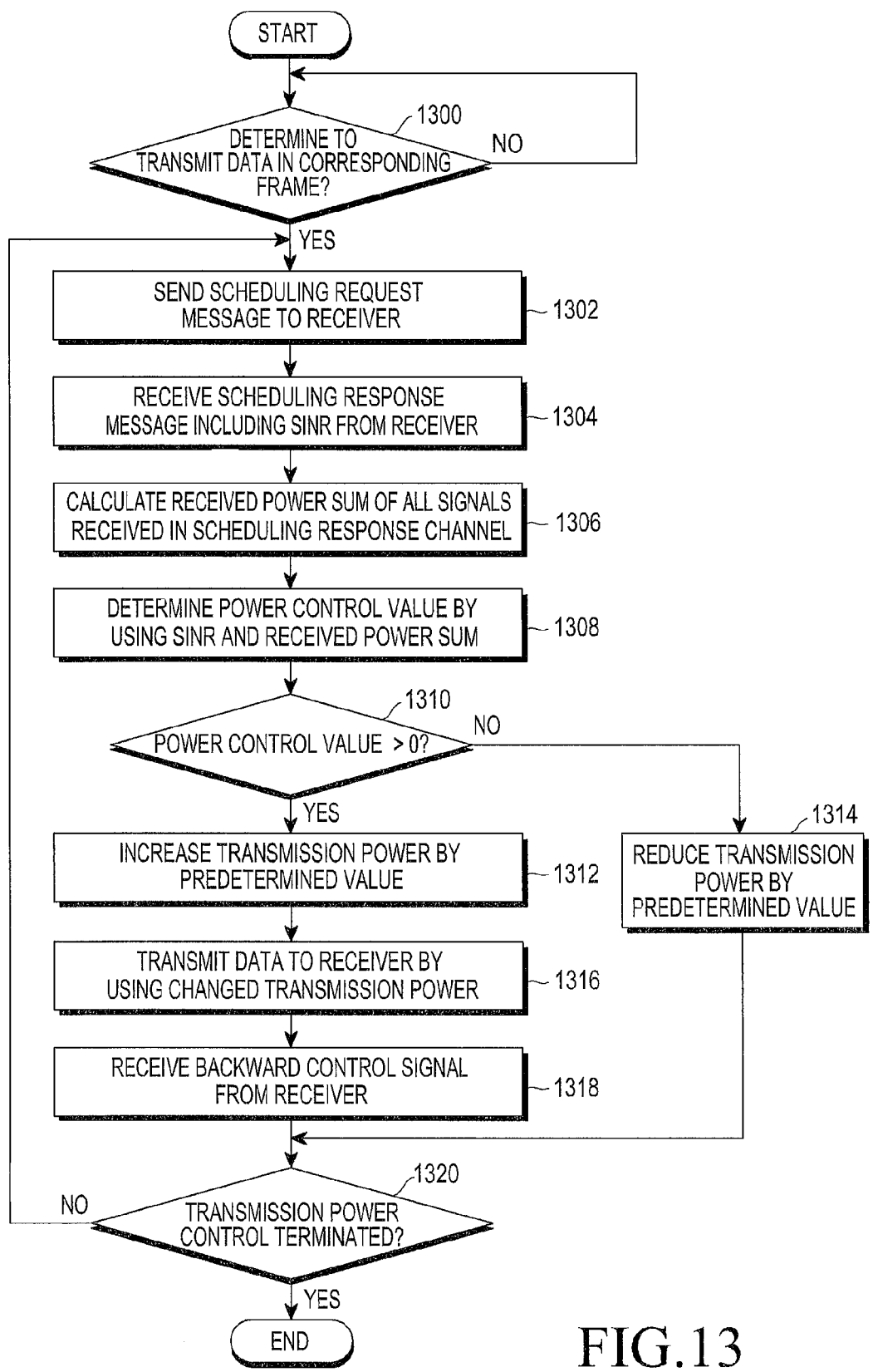
FIG. 13 illustrates a process of an operation of a transmitter in a wireless communication system where the transmitter and a receiver for data transmission and reception are changed and an uplink and a downlink are not clearly distinguished according to an embodiment of the present disclosure.
Figure 14:
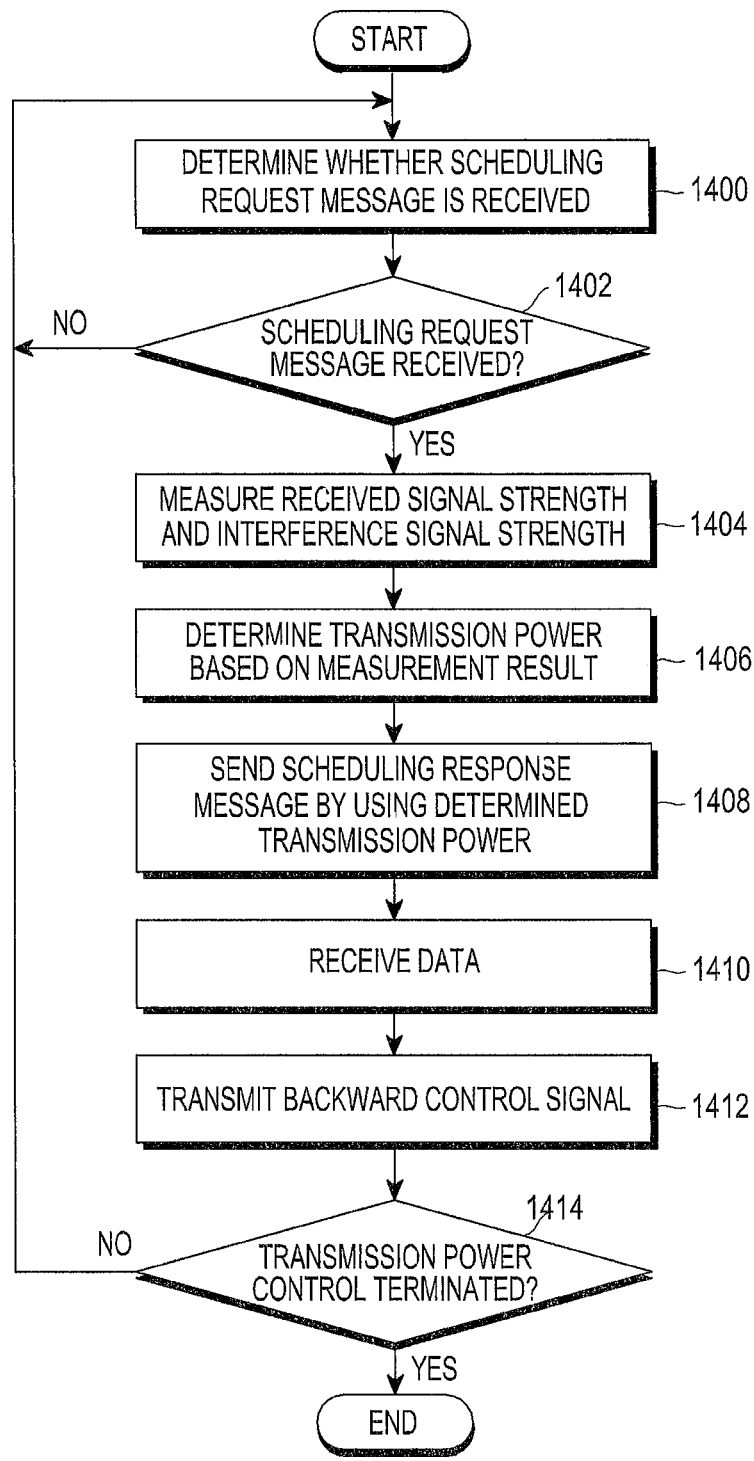
FIG. 14 illustrates a process of an operation of a receiver in a wireless communication system where a transmitter and the receiver for data transmission and reception are changed and an uplink and a downlink are not clearly distinguished according to an embodiment of the present disclosure.

Referring to FIGS. 13 and 14, a description will be made of operations of a transmitter and a receiver in a wireless communication system where a transmitter and a receiver for data transmission and reception are changed and an uplink and a downlink are not clearly distinguished.

FIG. 13 illustrates a process of an operation of a transmitter in a wireless communication system where the transmitter and a receiver for data transmission and reception are changed and an uplink and a downlink are not clearly distinguished according to an embodiment of the present disclosure.

Referring to FIG. 13, the transmitter n determines whether to transmit data in a frame in operation 1300. Once determining to transmit data, the transmitter n sends a scheduling request message to the receiver $r_{n,k}$ in a scheduling request channel (or a scheduling request subchannel) in operation 1302. The scheduling request message may include an index for specifying the transmitter and the receiver.

The transmitter n receives a scheduling response message from the receiver $r_{n,k}$ in a scheduling response channel (or a scheduling response subchannel) in operation 1304. The scheduling response message may include an index for the transmitter and the receiver and SINR $\eta_{r_{n,k}}$.

The transmitter n calculates a sum of received powers, $RSS_n$, for all signals received in the scheduling response channel in operation 1306. The transmitter n determines a power control value $$\frac{\partial U}{\partial P_n}$$

by using the SINR $\eta_{r_{n,k}}$ and the sum of received powers, $RSS_n$ in operation 1308. The transmitter n may determine the power control value by using Equation 7.

The transmitter n determines whether the power control value is greater than a predetermined value (for example, 0) in operation 1310. The transmitter n goes to operation 1312 to increase a transmission power by a predetermined value, if the power control value is greater than 0. In this embodiment, the increased transmission power is less than a maximum value. If the power control value is not greater than 0, the transmitter n goes to operation 1314 to reduce the transmission power by the predetermined value. The reduced transmission power is greater than a minimum value. In an embodiment, if the minimum value of the transmission power is 0 [W] and the predetermined value for increasing or reducing the transmission power, used in operations 1312 and 1314, is equal to the maximum value of the transmission power, then the transmission power may be 0 in operation 1314.

The transmitter n transmits data to the receiver $r_{n,k}$ by using the changed transmission power in a forward data channel in operation 1316. The transmitter n receives a backward control channel signal from the receiver $r_{n,k}$ in the backward control channel in operation 1318. If the changed transmission power is set to 0 [W], then the transmitter n may not transmit data, but the receiver $r_{n,k}$ waits for reception of data from the transmitter $r_{n,k}$ in operation 1316.

The foregoing operations may be continuously repeated until the transmitter n terminates transmission power control in operation 1320.

Although FIG. 13 illustrates the operations of the transmitter in the wireless communication system where the transmitter and the receiver for data transmission and reception are changed and the uplink and the downlink are not clearly distinguished, various modifications may be made to FIG. 13. For example, continuous operations are illustrated in FIG. 13, but the operations illustrated in FIG. 13 may overlap with one another, may be performed in parallel with one another, may be performed in other orders, or may be performed several times.

FIG. 14 illustrates a process of an operation of a receiver in a wireless communication system where a transmitter and the receiver for data transmission and reception are changed and an uplink and a downlink are not clearly distinguished according to an embodiment of the present disclosure.

Referring to FIG. 14, the receiver $r_{n,k}$ determines whether a scheduling request message is received in a scheduling request channel (or a scheduling request subchannel) in operation 1400.

Upon receiving the scheduling request message from the transmitter n in operation 1402, the receiver $r_{n,k}$ goes to operation 1404 to measure a received signal strength and an interference signal strength. Herein, the receiver $r_{n,k}$ measures a received signal strength S corresponding to reception of the scheduling request message and measures a sum of signal powers as an interference signal strength I.

The receiver $r_{n,k}$ determines a transmission power based on the measurement result in operation 1406. For example, the receiver $r_{n,k}$ may calculate $\beta_{r_{n,k}}$ by using the received signal strength and the interference signal strength, and may determine the transmission power by using the calculated $\beta_{r_{n,k}}$.

The receiver $r_{n,k}$ sends a scheduling response message to the transmitter n by using the determined transmission power in operation 1408. The scheduling response message may include SINR $\eta_{r_{n,k}}$. The receiver $r_{n,k}$ receives data from the transmitter n in a forward data channel in operation 1410, and transmits a backward control signal to the transmitter n in a backward control channel in operation 1412.

The foregoing operations may be continuously repeated until the receiver $r_{n,k}$ determines in operation 1414 that the transmission power control operation of the transmitter n is terminated.

Although FIG. 14 illustrates the operations of the transmitter in the wireless communication system where the transmitter and the receiver for data transmission and reception are changed and the uplink and the downlink are not clearly distinguished, various modifications may be made to FIG. 14. For example, continuous operations are illustrated in FIG. 14, but the operations illustrated in FIG. 14 may overlap with one another, may be performed in parallel with one another, may be performed in other orders, or may be performed several times.

Figure 15:
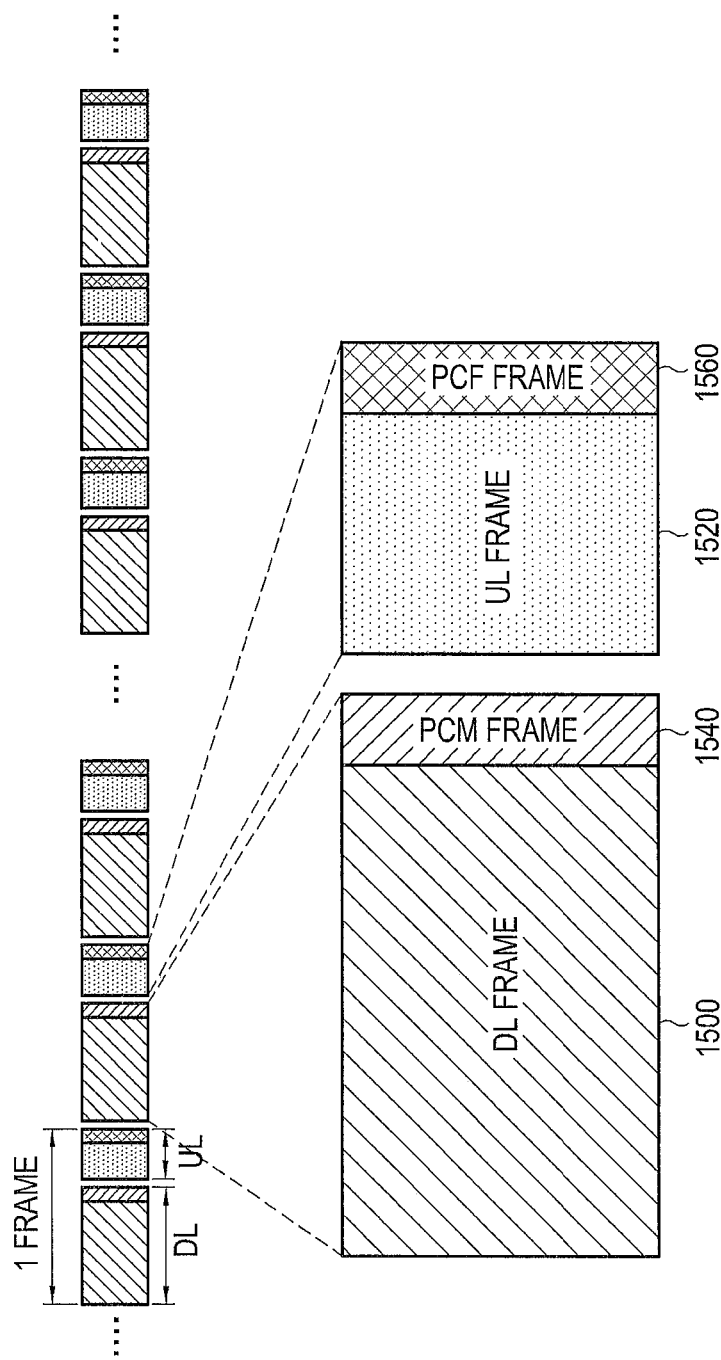
FIG. 15 illustrates an example of a resource configuration used when an uplink and a downlink are clearly distinguished in a wireless communication system where a transmitter and a receiver for data transmission and reception are changed according to an embodiment of the present disclosure.

(2) Communication Environment where an Uplink and a Downlink are Clearly Distinguished FIG. 15 illustrates an example of a resource configuration used when an uplink and a downlink are clearly distinguished in a wireless communication system where a transmitter and a receiver for data transmission and reception are changed according to an embodiment of the present disclosure.

Referring to FIG. 15, in a communication environment where a TDD scheme is used, an uplink and a downlink are clearly distinguished, such that all time resources may be used separately for a downlink frame 1500, which is used for a transmitter (for example, a base station) to transmit data to a receiver (for example, a terminal) and an uplink frame 1520, which is used for the receiver to transmit data to the transmitter.

In addition, as illustrated in FIG. 15, a power control measurement (PCM) frame 1540 for transmitting a signal that allows the receiver to measure a strength of a downlink signal and an interference is included in a downlink, and a PCF frame 1560 for downlink power control feedback is included in an uplink.

In an example embodiment, the transmitter transmits downlink scheduling information to the receiver before transmitting data (for example, before a T frame from a frame where data is to be transmitted). Thus, a receiver, which participates in downlink signal and interference measurement and power control feedback, may be the same as a receiver actually participating in data transmission and reception.

Once a transmitter and a receiver that are to perform downlink data transmission and reception in a frame (t+1) are determined in a frame (t+1)−T, then the transmitter transmits information about the determination to the receiver. In this embodiment, the transmitter transmits a predefined signal by using a currently used downlink transmission power in a PCM channel defined in a downlink resource of the frame t.

Then, the receiver (for example, the receiver $r_{m,k}$) receives a signal from a PCM channel of a frame t to measure a signal strength $g_{m,r_{m,k}}p_m$ of a downlink and an interference and noise strength $I_{r_{m,k}}+n_{r_{m,k}}$. The receiver feeds back ACK or CQI by using a transmission power of $p_{r_{m,k}}^S = \delta \cdot \beta_{r_{m,k}}$ in a PCF channel.

In this embodiment, each transmitter obtains RSS, as expressed in Equation 5 by measuring a received power for a PCF channel. $\eta_{r_{m,k}}$ expressed in Equation 6 may be transmitted by being piggybacked in an existing feedback channel defined and used for feedback of ACK or CQI separately from the PCF channel, or in a separate channel.

Figure 16:
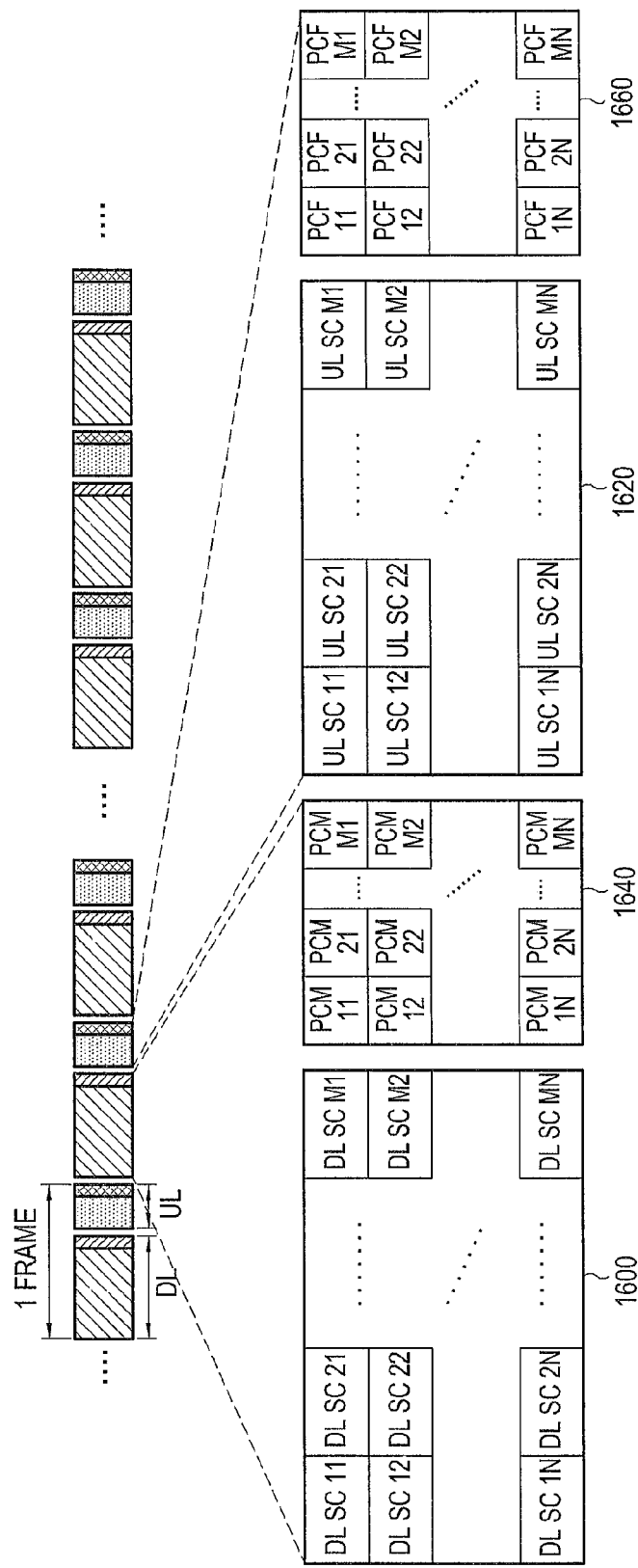
FIG. 16 illustrates another example of a resource configuration used when an uplink and a downlink are clearly distinguished in a wireless communication system where a transmitter and a receiver for data transmission and reception are changed according to an embodiment of the present disclosure.

FIG. 16 illustrates another example of a resource configuration used when an uplink and a downlink are clearly distinguished in a wireless communication system where a transmitter and a receiver for data transmission and reception are changed according to an embodiment of the present disclosure.

In FIG. 16, an example is illustrated in which a downlink frame 1600, an uplink frame 1620, a PCM frame 1640, and a PCF frame 1660 are separately used as multiple subchannels on the time domain and the frequency domain.

Referring to FIG. 16, multiple downlink subchannels DL SC 11 through DL SC MN, PCM frames PCM 11 through PCM MN, and PCF frames PCF 11 through PCF MN one-to-one correspond to one another.

Once a transmitter and a receiver that are to perform downlink data transmission and reception in the frame (t+1) are determined in the frame (t+1)−T, the transmitter may transmit information about the determination to the receiver. In this embodiment, the transmitter may transmit a predefined signal by using a transmission power that is currently used in a downlink data subchannel in a PCM subchannel corresponding to a downlink subchannel for use by the transmitter in a downlink resource of the frame t.

The receiver (for example, the receiver $r_{m,k}$) then receives each PCM subchannel of the frame t to measure a signal strength $g_{m,r_{m,k}}p_m$ and an interference and noise strength $I_{r_{m,k}}+n_{r_{m,k}}$ for each downlink subchannel. The receiver also feeds back ACK or CQI by using a transmission power of $p_{r_{m,k}}^S = \delta \cdot \beta_{r_{m,k}}$ in a PCF subchannel corresponding to a downlink subchannel the receiver is to receive.

In this embodiment, each transmitter may obtain RSS, as expressed in Equation 5 by measuring a received power for each PCF subchannel. The value $\eta_{r_{m,k}}$ expressed in Equation 6 for each subchannel may be transmitted by being piggybacked in an existing feedback channel defined and used to feed back ACK or CQI, separately from a PCF channel, or in a separate channel.

Figure 17:
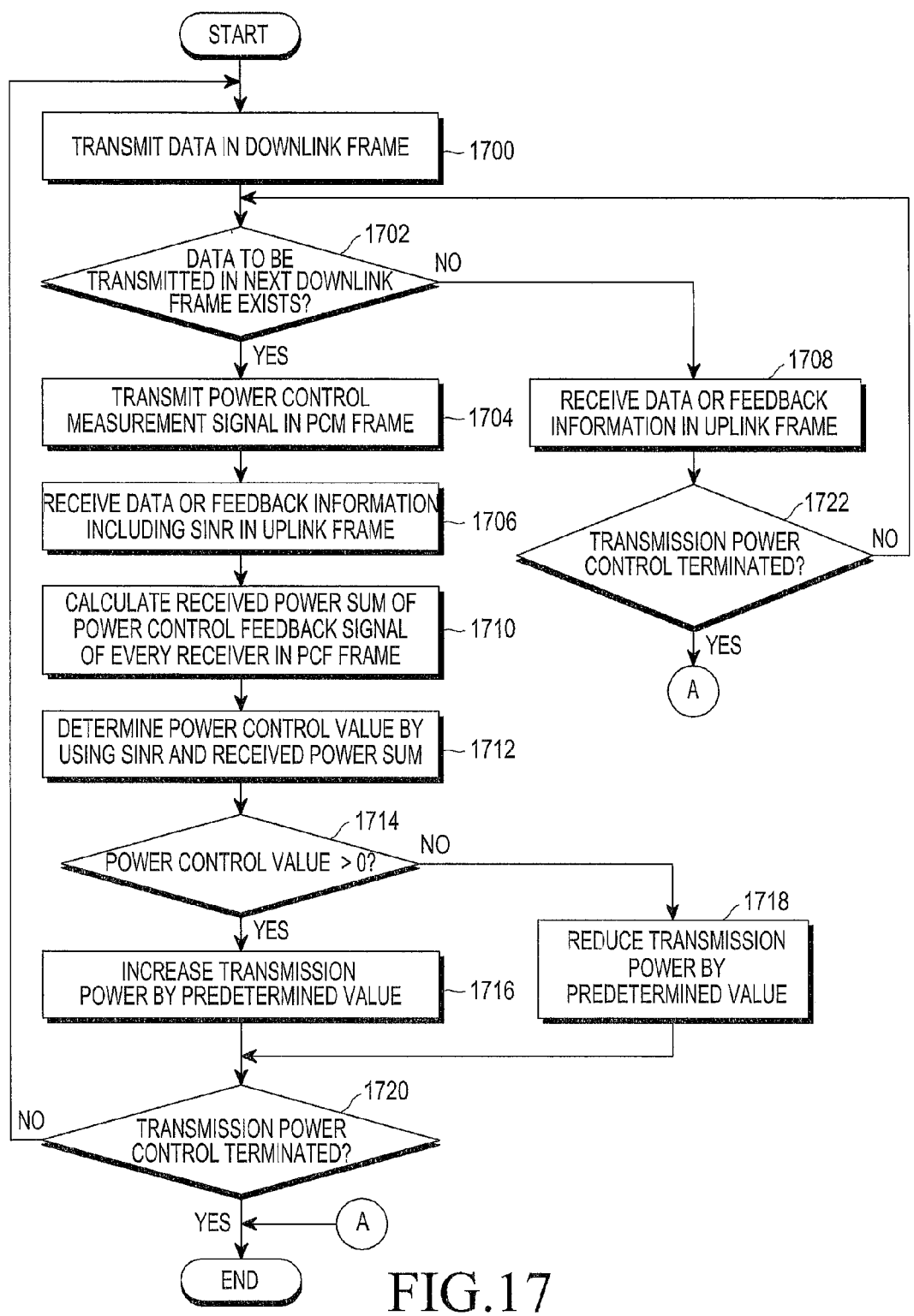
FIG. 17 illustrates a process of an operation of a transmitter in a wireless communication system where the transmitter and a receiver for data transmission and reception are changed and an uplink and a downlink are clearly distinguished according to an embodiment of the present disclosure.
Figure 18:
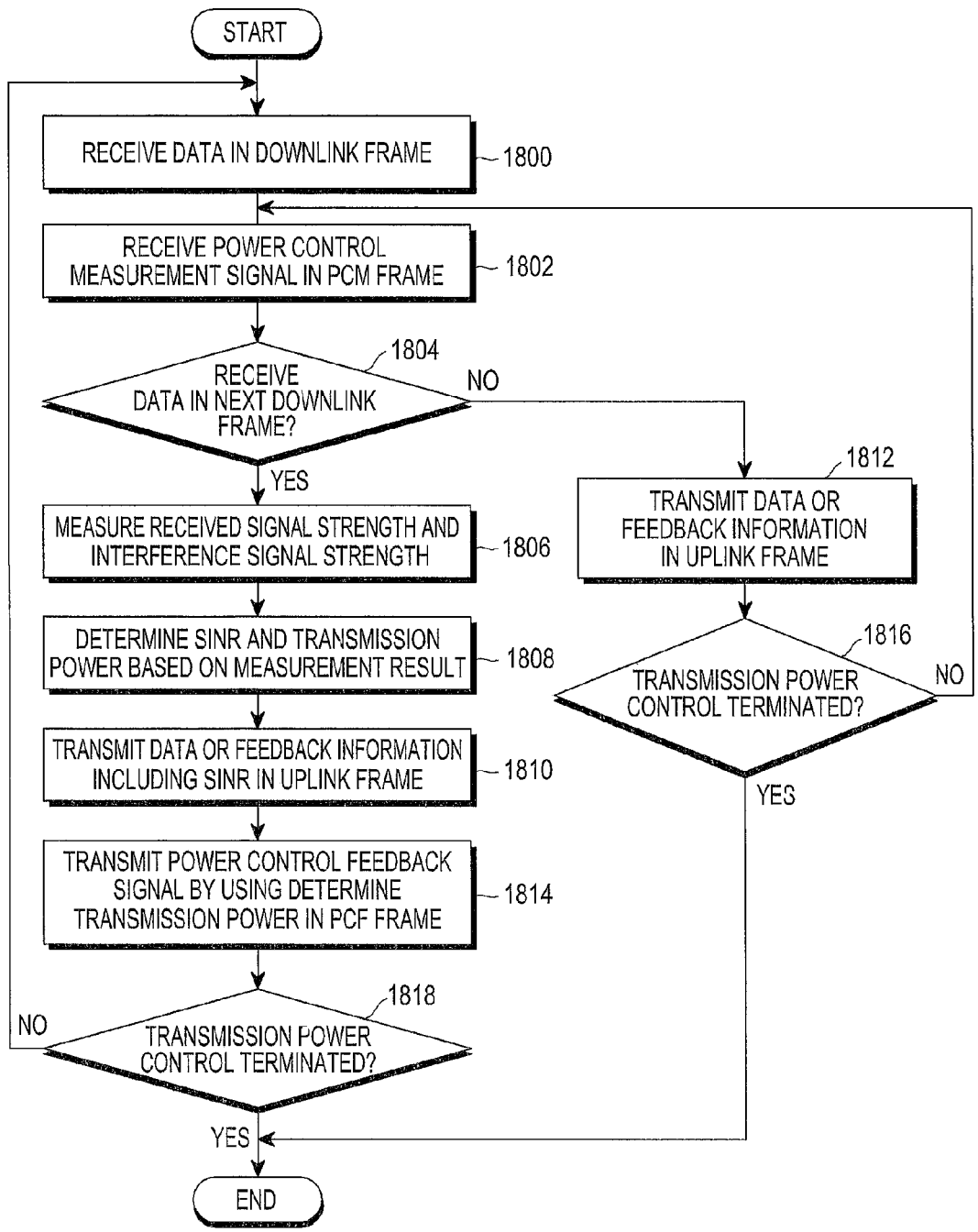
FIG. 18 illustrates a process of an operation of a receiver in a wireless communication system where a transmitter and the receiver for data transmission and reception are changed and an uplink and a downlink are clearly distinguished according to an embodiment of the present disclosure.

Referring to FIGS. 17 and 18, a description will be made of operations of a transmitter and a receiver in a wireless communication system where the transmitter and the receiver are changed and an uplink and a downlink are clearly distinguished. In FIGS. 17 and 18, as described above, a situation will be considered in which a transmitter and a receiver that are to perform downlink data transmission and reception have been determined and corresponding scheduling information has been delivered to the receiver. For example, a situation will be considered where the transmitter transmits scheduling information, such as information about a receiver that is to receive data in the frame t and downlink subchannel information, to the receiver by using a separate resource in a frame (t–T), and each receiver has already known whether data is received in the frame t and a reception resource of the frame t.

FIG. 17 illustrates a process of an operation of a transmitter in a wireless communication system where the transmitter and a receiver for data transmission and reception are changed and an uplink and a downlink are clearly distinguished according to an embodiment of the present disclosure.

Referring to FIG. 17, the transmitter n transmits data to the receiver $r_{n,k}$ in a downlink frame in operation 1700. The transmitter n determines whether data to be transmitted in a next downlink frame exists in operation 1702. If there is no data to be transmitted in the next downlink frame, the transmitter n goes to operation 1708 to receive data or feedback information in an uplink frame.

If there is data to be transmitted in the next downlink frame, the transmitter n goes to operation 1704 to transmit a power control measurement signal in a PCM frame. The transmitter n receives data or feedback information including SINR $\eta_{r_{n,k}}$ in an uplink frame in operation 1706. Herein, the data or the feedback information may include a power control feedback signal that may be received in the PCF frame from the receiver $r_{n,k}$ that is to receive data in the next frame.

The transmitter n calculates a sum of received powers $RSS_n$ for a power control feedback signal of every receiver in the PCF frame in operation 1710. The transmitter n determines a power control value $$\frac{\partial U}{\partial P_n}$$

by using the SINR and the sum of the received powers $RSS_n$ in operation 1712. In this embodiment, the transmitter n may determine the power control value by using Equation 7.

The transmitter n determines whether the power control value is greater than a predetermined value (for example, 0) in operation 1714. If the power control value is greater than 0, the transmitter n goes to operation 1716 to increase the transmission power by a predetermined value. If the power control value is not greater than 0, the transmitter n goes to operation 1718 to reduce the transmission power by the predetermined value.

The foregoing operations may be continuously repeated until the transmitter n terminates transmission power control in operation 1720.

Although FIG. 17 illustrates the operations of the transmitter in the wireless communication system where the transmitter and the receiver for data transmission and reception are changed and the uplink and the downlink are clearly distinguished, various modifications may be made to FIG. 17. For example, continuous operations are illustrated in FIG. 17, but the operations illustrated in FIG. 17 may overlap with one another, may be performed in parallel with one another, may be performed in other orders, or may be performed several times.

FIG. 18 illustrates a process of an operation of a receiver in a wireless communication system where a transmitter and the receiver for data transmission and reception are changed and an uplink and a downlink are clearly distinguished according to an embodiment of the present disclosure.

Referring to FIG. 18, in operation 1800, the receiver $r_{n,k}$ receives data in a downlink frame. The receiver $r_{n,k}$ receives a power control measurement signal transmitted by the transmitter n in a PCM frame in operation 1802.

The receiver $r_{n,k}$ determines in operation 1804 whether to receive data in a next downlink frame. If determining not to receive data in the next frame, the receiver $r_{n,k}$ goes to operation 1812 to transmit data or feedback information to the transmitter n in an uplink frame.

If determining to transmit data in the next frame, the receiver $r_{n,k}$ goes to operation 1806 to measure a received signal strength and an interference signal strength in the PCM frame. The receiver $r_{n,k}$ determines SINR $\eta_{r_{n,k}}$ and a transmission power based on the measurement result in operation 1808. In an example embodiment, the receiver $r_{n,k}$ calculates SINR $\eta_{r_{n,k}}$ based on the measured received signal strength and interference signal strength. The receiver $r_{n,k}$ calculates $\beta_{r_{n,k}}$ based on the measured received signal strength and interference signal strength and determines a transmission power by using the calculated $\beta_{r_{n,k}}$. The transmission power may be determined, for example, by $p_{r_{n,k}}^S = \delta \cdot \beta_{r_{n,k}}$.

The receiver $r_{n,k}$ goes to operation 1810 to transmit data or feedback information including the SINR in an uplink frame. The receiver $r_{n,k}$ transmits a power control feedback signal to the transmitter n in the PCF frame by using the determined transmission signal in operation 1814.

The foregoing operations may be continuously repeated until the receiver $r_{n,k}$ determines in operation 1818 that the transmission power control operation of the transmitter n is terminated.

Although FIG. 18 illustrates the operations of the transmitter in the wireless communication system where the transmitter and the receiver for data transmission and reception are not changed and the uplink and the downlink are not clearly distinguished, various modifications may be made to FIG. 18. For example, continuous operations are illustrated in FIG. 18, but the operations illustrated in FIG. 18 may overlap with one another, may be performed in parallel with one another, may be performed in other orders, or may be performed several times.

Next, internal structures of the transmitter and the receiver according to an embodiment of the present disclosure will be described with reference to FIGS. 19 and 20.

Figure 19:
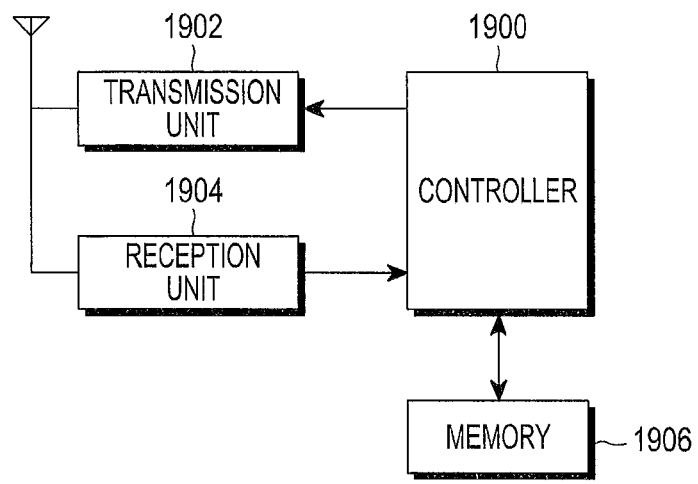
FIG. 19 illustrates a block diagram of a transmitter according to an embodiment of the present disclosure.

FIG. 19 illustrates a block diagram of a transmitter according to an embodiment of the present disclosure.

Referring to FIG. 19, the transmitter may include a controller 1900, a transmission unit 1902, a reception unit 1904, and a memory 1906.

The transmitter 1902 and the receiver 1904 are elements for communicating with the receiver and perform operations associated with data transmission and reception. The memory 1906 stores various information generated according to operations of the transmitter and transmitted and received signals and data.

The controller 1900 controls the overall operation of the transmitter by controlling the transmission unit 1902, the reception unit 1904, and the memory 1906. In an embodiment, the controller 1900 controls the foregoing elements to perform the above-described operations of the transmitter according to an embodiment of the present disclosure.

While the transmitter is implemented with separate processors such as the controller 1900, the transmission unit 1902, the reception unit 1904, and the memory 1906 in FIG. 19, the transmitter may also be implemented with one processor in which the controller 1900, the transmission unit 1902, the reception unit 1904, and the memory 1906 are integrated.

Figure 20:
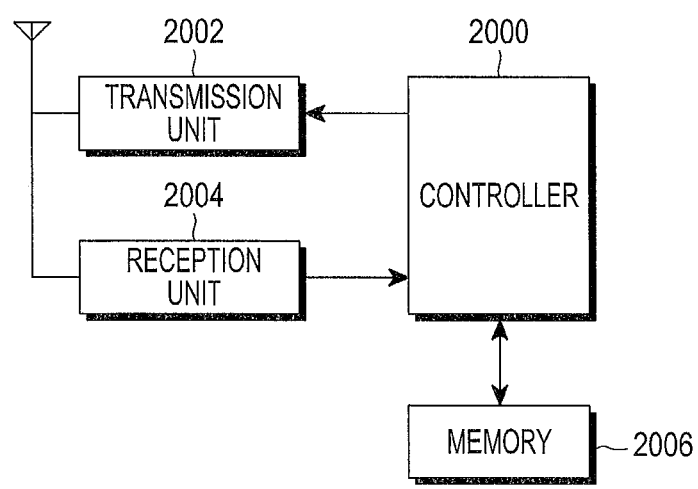
FIG. 20 illustrates a block diagram of a receiver according to an embodiment of the present disclosure.

FIG. 20 illustrates a block diagram of a receiver according to an embodiment of the present disclosure.

Referring to FIG. 20, the receiver may include a controller 2000, a transmission unit 2002, a reception unit 2004, and a memory 2006.

The transmission unit 2002 and the reception unit 2004 are elements for communicating with the transmitter and perform operations associated with data transmission and reception. The memory 2006 stores various information generated according to operations of the transmitter and transmitted and received signals and data.

The controller 2000 controls the overall operation of the transmitter by controlling the transmission unit 2002, the reception unit 2004, and the memory 2006. In an embodiment, the controller 2000 controls the foregoing elements to perform the above-described operations of the transmitter according to an embodiment of the present disclosure.

Although the receiver is implemented with separate processors, such as the controller 2000, the transmission unit 2002, the reception unit 2004, and the memory 2006, in FIG. 20, the receiver may also be implemented with one processor in which the controller 2000, the transmission unit 2002, the reception unit 2004, and the memory 2006 are integrated.

Hereinafter, a description will be made of performance corresponding to a situation where a method according to an embodiment of the present disclosure is used.

Figure 21:
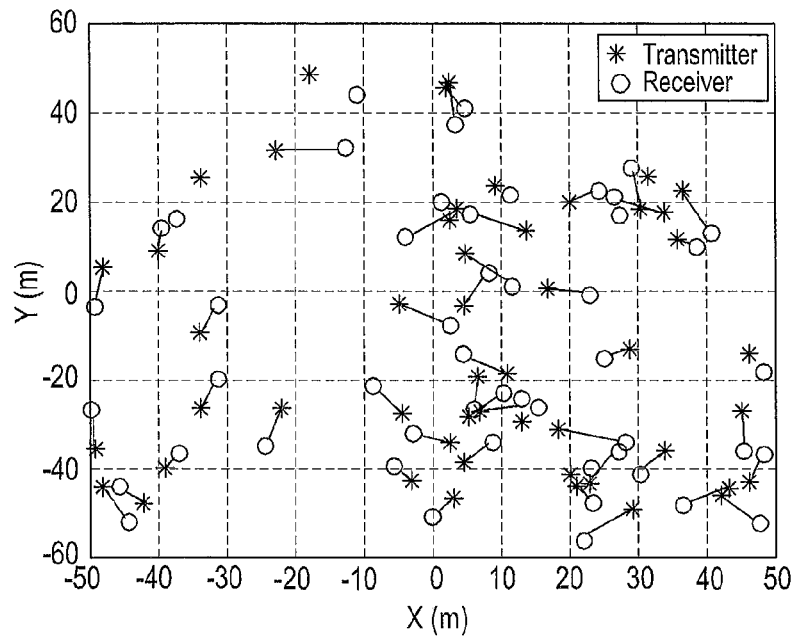
FIG. 21 illustrates a graph showing distribution of a transmitter and a receiver according to an embodiment of the present disclosure.

FIG. 21 illustrates a graph showing distributions of a transmitter and a receiver according to an embodiment of the present disclosure.

As illustrated in FIG. 21, consideration will be made regarding derivation of yield performance when multiple link pairs including one transmitter and one receiver are distributed at random and traffics of a full-buffer model are transmitted. In an example embodiment, a situation where 50 transmitter/receiver pairs exist in a square of 1000 m×1000 m will be considered.

A distance between a transmitter and a receiver is determined as a random value of less than 10 m. For power control, a maximum transmission power value $P_{max}$ and a minimum transmission power value $P_{min}$ are set to 23 dBm and 3 dBm, and an initial transmission power of each transmitter is set to $P_{max}$. A radio channel may only considers a path loss of $PL=d^{-3.5}$ without considering fading and shadowing. Consideration may also be taken regarding $W_{r_{m,k}}$ used in Equation 2, which has a random value of [0,1].

Figure 22:
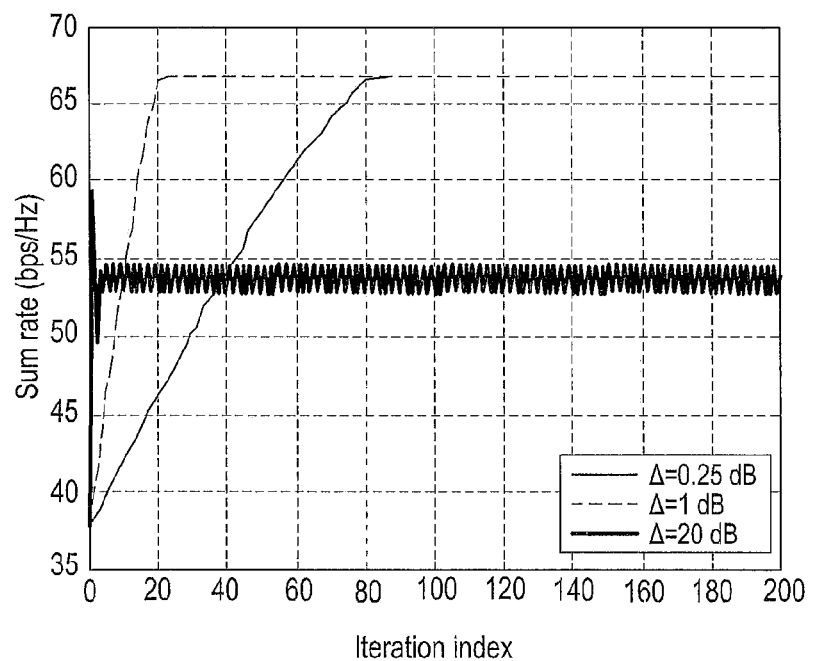
FIG. 22 illustrates a graph showing a weighted sum rate with respect to a the number of power control iterations according to an embodiment of the present disclosure.

FIG. 22 illustrates a graph showing a weighted sum rate with respect to the number of power control iterations according to an embodiment of the present disclosure.

A weighted sum rate expressed in Equation 1, which may be obtained by application of a method according to an embodiment of the present disclosure in the environment described in relation to FIG. 21, may be derived for each transmission power increment ($\Delta$), as illustrated in FIG. 22.

Referring to FIG. 22, when a method according to an embodiment of the present disclosure is applied, for $\Delta=0.25$ dB, a weighted sum rate is saturated to a predetermined value after about 80 power control iterations, in which when compared to a weighted sum rate corresponding to 1 power control iteration where every transmitter performs transmission with $P_{max}$, a gain of about 76% is obtained.

A weighted sum rate for $\Delta=1$ dB is also saturated to a value that is similar to that for $\Delta=0.25$ dB, such that the weighted sum rate for $\Delta=1$ dB is saturated with about 20 iterations, that is, merely with ¼ iterations with respect to those for $\Delta=0.25$ dB. However, comparing with an actually saturated weighted sum rate, a saturation value for $\Delta=1$ dB is lower than that for $\Delta=0.25$ dB, and have two repeated values having a small difference therebetween without being saturated to a predetermined value.

This tendency become apparent when considering a result for $\Delta=0.20$ dB in which after about 5 iterations, a weighted sum rate has two repeated values that are much smaller than those for $\Delta=0.25$ dB and $\Delta=1$ dB. Nevertheless, the result for $\Delta=0.20$ dB has a gain of about 46% when compared to an initial value.

Figure 23:
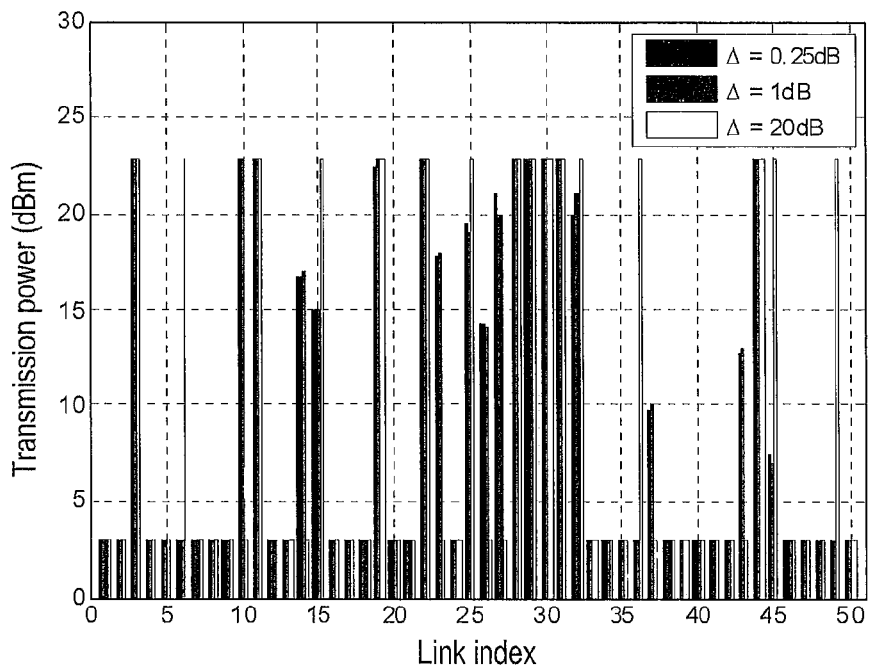
FIG. 23 illustrates a graph showing a transmission power of each transmitter obtained when power control is performed 200 times according to an embodiment of the present disclosure.

FIG. 23 illustrates a graph showing a transmission power of each transmitter obtained when power control is performed 200 times according to an embodiment of the present disclosure.

In FIG. 23, a transmission power of each transmitter is indicated for each $\Delta$. Referring to FIG. 23, it can be seen that most transmitters use a transmission power of $P_{max}$ or $P_{min}$ and some transmitters use a transmission power between $P_{max}$ and $P_{min}$, which indicates that on/off of a link may be determined based on a power control result. However, on/off of a link cannot be simply determined because for $\Delta=0.20$ dB, corresponding transmitters have a transmission power of $P_{max}$ or $P_{min}$ according to power control, but their performance are degraded when compared to small $\Delta$.

Figure 24:
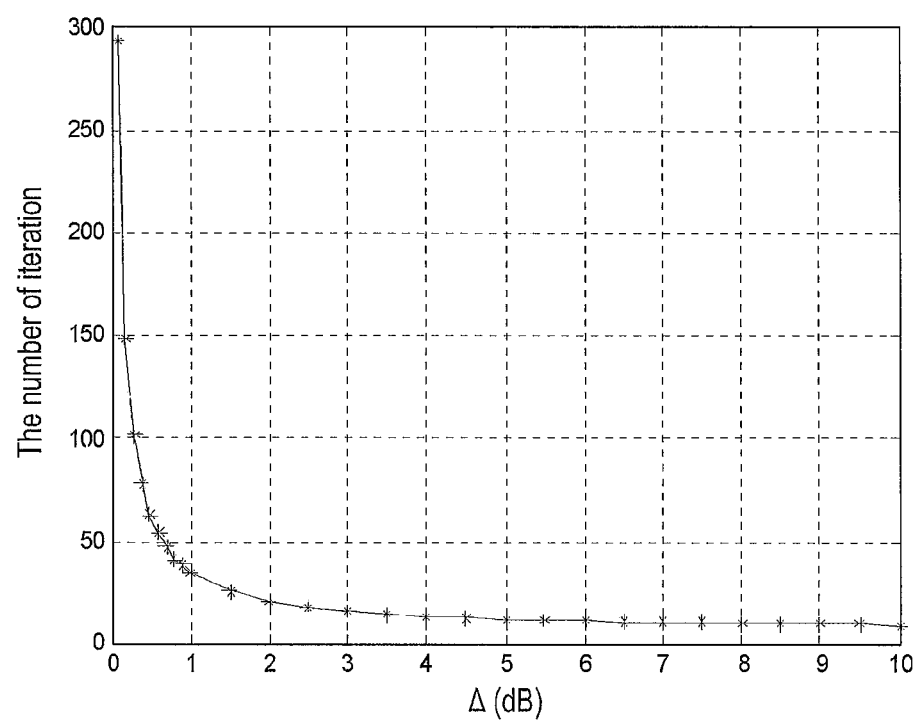
FIG. 24 illustrates a graph showing an average number of repetitions with respect to a transmission power increment/decrement, which is needed to reach a weighted sum rate where two identical values are repeated, according to an embodiment of the present disclosure.

FIG. 24 illustrates a graph showing an average number of repetitions with respect to a transmission power increment/decrement, which is needed to reach a weighted sum rate where two identical values are repeated, according to an embodiment of the present disclosure.

When a method according to an embodiment of the present disclosure is used, a ping-pong phenomenon where two values are repeated, in which as a value approaches a suboptimal solution, it cannot approach the suboptimal solution any closer according to $\Delta$ and +$\Delta$ (a transmission power increment) and −$\Delta$ (a transmission power decrement) are repeated. In this embodiment, a yield for +$\Delta$ and a yield for −$\Delta$ are repeated. In FIG. 24, the number of repetitions of the ping-ponged two values is shown.

In an example embodiment, FIG. 24 shows the average number of repetitions with respect to $\Delta$ for distribution of 100 transmitters when a weighted sum rate where two identical values are repeated is reached. Referring to FIG. 24, the average number of repetitions sharply decreases when $\Delta$ is in a range of [0,2] dB, whereas when $\Delta$ is higher than 2 dB, the amount of decrease in the average number of repetitions is not large.

Figure 25:
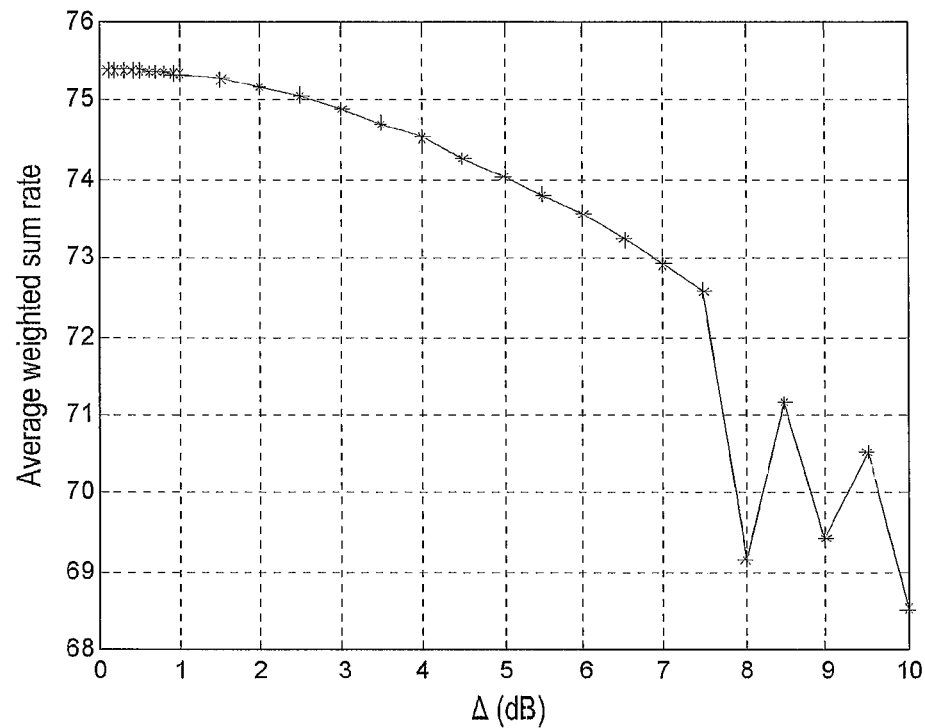
FIG. 25 illustrates a graph showing an average weighted sum rate with respect to a transmission power increment/decrement when a weighted sum rate where two identical values are repeated is reached, according to an embodiment of the present disclosure.

FIG. 25 illustrates a graph showing an average weighted sum rate with respect to a transmission power increment/decrement when a weighted sum rate where two identical values are repeated is reached, according to an embodiment of the present disclosure.

FIG. 25 shows an average weighted sum rate with respect to Δ for distribution of 100 transmitters when a weighted sum rate where two identical values are repeated is reached. Referring to FIG. 25, a decrement of the average weighted sum rate is not large when Δ is in a range of [0,2] dB, whereas when Δ is higher than 2 dB, the decrement decreases almost linearly with respect to Δ (dB).

Referring to FIGS. 24 and 25, by setting Δ to a value in a range of [1,2] dB, an algorithm for high saturation speed and small performance degradation may be operated. In an example embodiment, the irregularity of a yield curve for Δ=8 dB or higher may be caused because Δ is excessively large and thus fails in reaching a local optimum.

Figure 26:
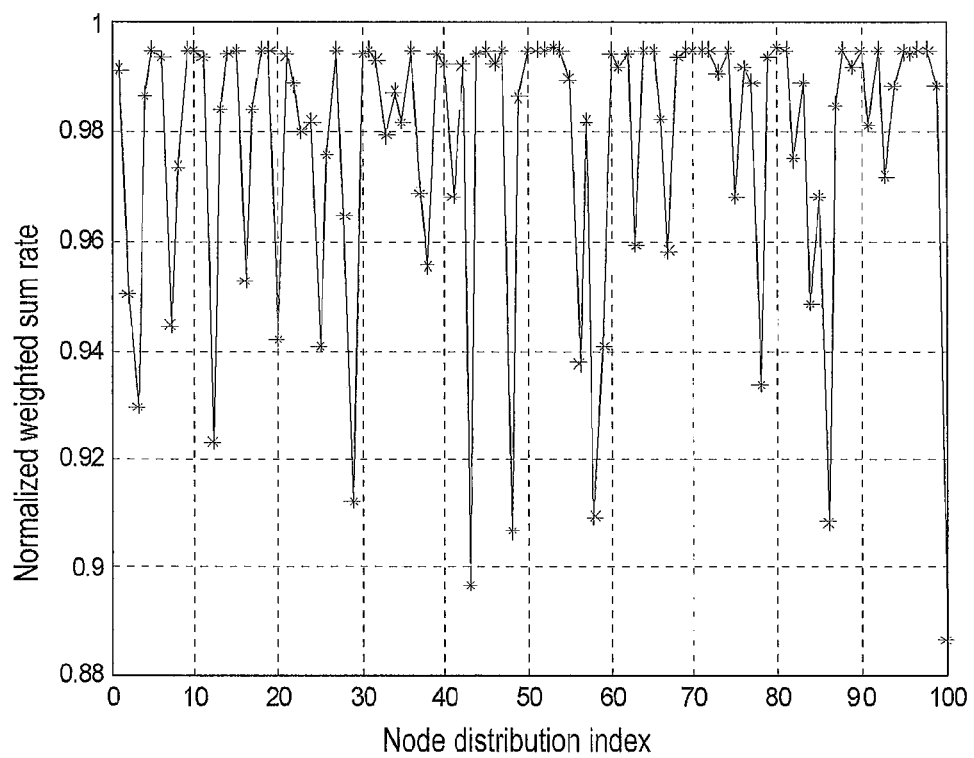
FIG. 26 illustrates a graph showing performance comparison between a method according to an embodiment of the present disclosure and an optimal power control method.

FIG. 26 illustrates a graph showing performance comparison between a method according to an embodiment of the present disclosure and an optimal power control method. In FIG. 26, unlike in FIGS. 21 through 25, there are four transmission and reception end pairs. This is because, due to high complexity of the optimal power control method, it is difficult to derive optimal performance in a situation where the number of transmission and reception end pairs is greater than four.

The performance of the method according to an embodiment of the present disclosure corresponds to a situation where the weighted sum rate of Equation 1 is saturated in a predetermined range of variation. FIG. 26 shows a rate of achievement of a weighted sum rate with the use of a method according to an embodiment of the present disclosure with respect to a weighted sum rate with the use of the optimal power control method for distribution of 100 transmitters. Referring to FIG. 26, on average, the method according to an embodiment of the present disclosure has a performance of about 97.8% with respect to the performance of the optimal power control method.

Specific aspects of the present disclosure may be embodied as a computer-readable code on a computer-readable recording medium. The recording medium may be all kinds of recording devices storing data that is readable by a computer. Examples of the recording medium include read-only memory (ROM), random access memory (RAM), CD-ROMs, magnetic tapes, floppy disks, optical data storage devices, carrier waves (such as data transmission over the Internet), and the like. The computer-readable recording medium can also be distributed over a network of coupled computer systems such that the computer-readable code is stored and executed in a decentralized fashion. Functional programs, code, and code segments for achieving the present disclosure may be easily interpreted by skilled programmers in the art.

The method and apparatus according to an embodiment of the present disclosure may be implemented by hardware, software, or a combination of hardware and software. Such software may be stored, whether or not erasable or re-recordable, in a volatile or non-volatile storage such as a ROM, a memory such as a RAM, a memory chip, a device, or an integrated circuit; and an optically or magnetically recordable and machine (e.g., computer)-readable storage medium such as a compact disc (CD), a digital versatile disk (DVD), a magnetic disk, or a magnetic tape. It can be seen that the method according to the present disclosure may be implemented by a computer or a portable terminal which includes a controller and a memory, and the memory is an example of a machine-readable storage medium which is suitable for storing a program or programs including instructions for implementing the embodiment of the present disclosure.

Therefore, the present disclosure includes a program including codes for implementing an apparatus or method claimed in an arbitrary claim and a machine-readable storage medium for storing such a program. The program may be electronically transferred through an arbitrary medium such as a communication signal delivered through a wired or wireless connection, and the present disclosure properly includes equivalents thereof.

The apparatus according to an embodiment of the present disclosure may receive and store the program from a program providing device connected in a wired or wireless manner. The program providing device may include a memory for storing a program including instructions for instructing the apparatus to execute a preset method, information necessary for the method, a communication unit for performing wired or wireless communication with the apparatus, and a controller for transmitting a corresponding program to the apparatus at the request of the apparatus or automatically The power control and signaling methods according to an embodiment of the present disclosure may reduce a large amount of information to be exchanged between nodes for power control, to single information. Moreover, in an embodiment of the present disclosure, every receiver transmits information to be exchanged between nodes by using the same resource, such that a fixed-size radio resource may be used regardless of the number of interference links. In an embodiment, by repetitively using the power control method proposed in an embodiment of the present disclosure, sub-optimal system performance may be obtained.

Other effects that may be obtained or expected from the embodiments of the present disclosure are explicitly or implicitly disclosed in the detailed description of the embodiment of the present disclosure. For example, various effects expected from the embodiments of the present disclosure have been disclosed in the detailed description of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for controlling a transmission power by a transmitter in a wireless communication system, the method comprising:
   transmitting a reference signal to a first receiver and a second receiver;
   receiving a first feedback signal transmitted based on first transmission power in the first receiver and a second feedback signal transmitted based on second transmission power in the first receiver, with respect to the reference signal;
   determining a sum of received signal strengths of the first feedback signal and the second feedback signal;
   determining a power control value based on channel state information included in each of the first feedback signal and the second feedback signal and the sum of the received signal strengths; and
   controlling the transmission power of the transmitter based on the determined power control value,
   wherein the first transmission power is determined based on a received signal strength and an interference and noise strength measured in the first receiver, and wherein the second transmission power is determined based on a received signal strength and an interference and noise strength measured in the second receiver.

2. The method of claim 1, wherein a resource used by the first receiver to transmit the first feedback signal is the same as a resource used by the second receiver to transmit the second feedback signal.

3. The method of claim 1, wherein the controlling of the transmission power comprises:
determining whether the power control value is greater than a predetermined value; and
increasing or reducing the transmission power based on a result of the determination.

4. The method of claim 1, wherein a resource used to transmit the reference signal, a resource used to receive the first feedback signal, and a resource used to receive the second feedback signal are different from a resource used for data transmission and reception among the transmitter, the first receiver, and the second receiver.

5. The method of claim 1, wherein a resource used to transmit the reference signal, a resource used to receive the first feedback signal, and a resource used to receive the second feedback signal are the same as a resource used for data transmission and reception among the transmitter, the first receiver, and the second receiver.

6. The method of claim 1, wherein the first feedback signal includes index information for each of the transmitter and the first receiver, and the second feedback signal includes index information for each of the transmitter and the second receiver, and
wherein the first feedback signal is received on a resource scheduled by the first receiver, and the second feedback signal is received on a resource scheduled by the second receiver.

7. A method for transmitting a feedback signal by a first receiver in a wireless communication system, the method comprising:
receiving a reference signal from a transmitter;
determining a received signal strength and an interference and noise strength with respect to the reference signal;
determining first channel state information and first transmission power based on the received signal strength and the interference and noise strength; and
transmitting a first feedback signal including the first channel state information to the transmitter based on the first transmission power,
wherein the first channel state information, second channel state information and a sum of received signal strengths determined in the transmitter are used for determining a power control value to control transmission power of the transmitter,
wherein the received signal strengths are related to the first feedback signal and a second feedback signal, the second feedback signal includes the second channel state information of a second receiver and transmitted to the transmitter based on second transmission power in the second receiver, and
wherein the second transmission power is determined based on a received signal strength and an interference and noise strength measured in the second receiver.

8. The method of claim 7, wherein a resource used to transmit the first feedback signal is the same as a resource used for the second receiver to transmit the second feedback signal to the transmitter.

9. The method of claim 7, wherein a resource used to transmit the first feedback signal has the same frequency domain as a frequency domain of a resource used for the transmitter to transmit the reference signal.

10. The method of claim 7, wherein a resource used to receive the reference signal from the transmitter and a resource used to transmit the first feedback signal to the transmitter are different from a resource used for data transmission and reception between the transmitter and the first receiver.

11. The method of claim 7, wherein a resource used to receive the reference signal from the transmitter and a resource used to transmit the first feedback signal to the transmitter are the same as a resource used for data transmission and reception between the transmitter and the first receiver.

12. The method of claim 7, wherein the first feedback signal includes index information for each of the transmitter and the first receiver, and the second feedback signal includes index information for each of the transmitter and the second receiver, and
wherein the first feedback signal is received on a resource scheduled by the first receiver, and the second feedback signal is received on a resource scheduled by the second receiver.

13. A transmitter in a wireless communication system, the transmitter comprising:
a transmission unit configured to transmit a reference signal to a first receiver and a second receiver;
a reception unit configured to receive a first feedback signal transmitted based on first transmission power in the first receiver and a second feedback signal transmitted based on second transmission power in the second receiver, with respect to the reference signal; and
a processor configured to determine a sum of received signal strengths of the first feedback signal and the second feedback signal, determine a power control value based on channel state information included in each of the first feedback signal and the second feedback signal and the sum of the received signal strengths, and control transmission power of the transmitter based on the determined power control value,
wherein the first transmission power is determined based on a received signal strength and an interference and noise strength measured in the first receiver, and
wherein the second transmission power is determined based on a received signal strength and an interference and noise strength measured in the second receiver.

14. The transmitter of claim 13, wherein a resource used by the first receiver to transmit the first feedback signal is the same as a resource used by the second receiver to transmit the second feedback signal.

15. The transmitter of claim 13, wherein the controller is configured to determine whether the power control value is greater than a predetermined value, and increases or reduces the transmission power based on a result of the determination.

16. The transmitter of claim 13, wherein a resource used to transmit the reference signal, a resource used to receive the first feedback signal, and a resource used to receive the second feedback signal are different from a resource used for data transmission and reception among the transmitter, the first receiver, and the second receiver.

17. The transmitter of claim 13, wherein a resource used to transmit the reference signal, a resource used to receive the first feedback signal, and a resource used to receive the second feedback signal are the same as a resource used for data transmission and reception among the transmitter, the first receiver, and the second receiver.

18. The transmitter of claim 13, wherein the first feedback signal includes index information for each of the transmitter and the first receiver, and the second feedback signal includes index information for each of the transmitter and the second receiver, and
wherein the first feedback signal is received on a resource scheduled by the first receiver, and the second feedback signal is received on a resource scheduled by the second receiver.

19. A first receiver in a wireless communication system, the first receiver comprising:
a reception unit configured to receive a reference signal from a transmitter;
a processor configured to determine a received signal strength and an interference and noise strength with respect to the received signal and determine first channel state information and first transmission power based on the received signal strength and the interference and noise strength; and
a transmission unit configured to transmit a first feedback signal including the first channel state information to the transmitter based on the first transmission power,
wherein a sum of received signal strengths determined in the transmitter, and the first channel state information and second channel state information are used for determining a power control value to control transmission power of the transmitter, and
wherein the received signal strengths are related to the first feedback signal and a second feedback signal, the second feedback signal includes the second channel state information of a second receiver and transmitted to the transmitter based on second transmission power in the second receiver, and
wherein the second transmission power is determined based on a received signal strength and an interference and noise strength measured in the second receiver.

20. The first receiver of claim 19, wherein a resource used to transmit the first feedback signal is the same as a resource used for the second receiver to transmit the second feedback signal to the transmitter.

21. The first receiver of claim 19, wherein a resource used to transmit the first feedback signal has the same frequency domain as a frequency domain of a resource used for the transmitter to transmit the reference signal.

22. The first receiver of claim 19, wherein a resource used to receive the reference signal from the transmitter and a resource used to transmit the first feedback signal to the transmitter are different from a resource used for data transmission and reception between the transmitter and the first receiver.

23. The first receiver of claim 19, wherein a resource used to receive the reference signal from the transmitter and a resource used to transmit the first feedback signal to the transmitter are the same as a resource used for data transmission and reception between the transmitter and the first receiver.

24. The first receiver of claim 19, wherein the first feedback signal includes index information for each of the transmitter and the first receiver, and the second feedback signal includes index information for each of the transmitter and the second receiver, and
wherein the first feedback signal is received on a resource scheduled by the first receiver, and the second feedback signal is received on a resource scheduled by the second receiver.

* * * * *